United States Patent
Mitsuhashi

(10) Patent No.: US 6,535,293 B1
(45) Date of Patent: Mar. 18, 2003

(54) PRINTING SYSTEM, PRINTING CONTROL METHOD, DATA PROCESSING APPARATUS AND METHOD, AND STORAGE MEDIUM THEREFOR

(75) Inventor: Shunya Mitsuhashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/298,962

(22) Filed: Apr. 26, 1999

(30) Foreign Application Priority Data

Apr. 28, 1998 (JP) .......................................... 10-118739

(51) Int. Cl.$^7$ .............................................. G06K 15/00
(52) U.S. Cl. ..................................... 358/1.13; 358/1.18
(58) Field of Search ........................... 358/1.1, 1.3, 1.4, 358/1.6, 1.13, 1.16, 1.17, 1.18, 538, 540, 450, 453; 382/173, 175, 176, 180, 195, 282, 283, 284

(56) References Cited

U.S. PATENT DOCUMENTS 4,974,171 A * 11/1990 Yeh et al. .................. 358/1.13
6,005,680 A * 12/1999 Luther et al. ................ 358/2.1

* cited by examiner

Primary Examiner—Arthur G. Evans
(74) Attorney, Agent, or Firm—Fitzpatrick, Cella, Harper & Scinto

(57) ABSTRACT

Print information to be printed by a printing apparatus is generated in response to a print request command, and coordinate information representing a plotting area of a generated print object is registered in a registration area. When a character string is printed, the registered coordinate information is compared with character-string print position information and whether or not there is overlap is determined. The type of processing for printing the character string is switched based upon the results of the determination, and it is possible to set a print processing mode that is optimum for a print object.

30 Claims, 22 Drawing Sheets

FIG. 3

GENERATED CODE OF IMAGE-TYPE PRINTER DRIVER → AMOUNT OF DATA OF PRINT IMAGE EXPANDED ON HOST SIDE

GENERATED CODE OF PDL-TYPE PRINTER DRIVER → AMOUNT OF DATA OF PRINT IMAGE EXPANDED ON HOST SIDE + AMOUNT OF DATA IN CHARACTER INFORMATION SEPARATED

FINAL PRINT IMAGE OF BAND n

SCHEMATIC VIEW SHOWING PROCESS FOR GENERATING PRINT IMAGE OF BAND n

FIG. 9

```
/*###AREA REGISTRATION PROCESSING###*/
ChkRECT. left   =min(TrgRECT.left    , ChkRECT. left   );
ChkRECT. top    =min(TrgRECT.top     , ChkRECT. top    );
ChkRECT. right  =max(TrgRECT.right   , ChkRECT. right  );
ChkRECT. bottom=max(TrgRECT.bottom   , ChkRECT. bottom );
```

FIG. 10

```
/*###AREA DISCRIMINATION PROCESSING###*/
BOOL ChkRECT(...){
    BOOL bNonOverlap=FALSE;
    if(!(((ChkRECT.left==ChkRECT.right)||(ChkRECT.top==ChkRECT.bottom))){
      if(pco->rclBounds.right<ChkRECT.left)
      ||(ChkRECT.right<pco->rclBounds.left)
      ||(pco->rclBounds.bottom <ChkRECT.top)
      ||(ChkRECT.bottom<pco->rclBounds.top))
      bNonOverlap=TRUE;
    }
    return(bNonOverlap);
}
```

FIG. 11

```
/*###TEXT PRINTING DDI###*/
BOOL DrvTextOut(......){
        :
    (DELETED)
        :
    if(bNonOverlap==TRUE){
      ImgTextOut(......);
    }
    else{
      PDLTextOut(......);
    }
}
```

●製本印刷(面付け両面印刷)が可能な
Page Composer機能

両面印刷ユニットを装着したプリンタでは、1枚の用紙の両面に2ページずつ印刷し、出力された用紙を指定した枚数分ごとにまとめて二つ折りにすると本の体裁になる製本印刷が可能です。綴じ代の調整や拡大、縮小の調整を行うこともできます。

●プレビューで印刷結果を確認しながら
行える用紙設定

印刷するときの様々な用紙設定は常にドライバプロパティ画面の左上のプレビュー画面に表示されています。
制作時の原稿サイズ、印刷時の用紙サイズ、1%刻みの拡大・縮小(50%〜200%)や2ページ/4ページを1枚の用紙に印刷する設定などもプレビュー画面を見ながら簡単に設定することができます。

```
typedef struct _SUBAREA
{
  short   flag;          //0:UNREGISTERED, 1:INDEPENDENT, 2:CONNECTED
  short   parentArea;    //INDEX OF SUBAREA WHICH BECOMES PARENT WHEN
                         //  CONNECTION IS MADE
  RECT    refRect;       //MANAGEMENT AREA OF SUBAREA
  RECT    regRect;       //REGISTRATION AREA OF BACKGROUND AREA INFORMATION
} SUBAREA
```

SUBAREA ChkArea[9]; // FOR SUBAREAS I TO X

ChkArea[0]

| 0 | 2 |
|---|---|
| X0 || 
| Y0 ||
| X1 ||
| Y1 ||
| 0 ||
| 0 ||
| 0 ||
| 0 ||

ChkArea[9]

| 0 | 0 |
|---|---|
| X4 ||
| Y1 ||
| X5 ||
| Y2 ||
| 0 ||
| 0 ||
| 0 ||
| 0 ||

ChkArea[0]

| 0 | 1 |
|---|---|
| X0 ||
| Y0 ||
| X1 ||
| Y1 ||
| X1s ||
| Y1s ||
| X1e ||
| Y1e ||

(TRANSPARENCY DESIGNATED)

PRINTING SYSTEM, PRINTING CONTROL METHOD, DATA PROCESSING APPARATUS AND METHOD, AND STORAGE MEDIUM THEREFOR

BACKGROUND OF THE INVENTION

This invention relates to a printing system constituting by a printing apparatus which operates upon receiving print information from a data processing apparatus (host computer), and a print data processing apparatus which is a combination of software modules referred to as printer drivers and device drivers that generate print information at the host computer side for the printing apparatus. The invention relates further to a printing control method, a data processing apparatus, a data processing method and a storage medium therefor.

A printing control method and the flow of processing in a conventional printing system will be described first.

In general, a printing system is constructed by connecting a host computer and a printing apparatus via parallel communication means, such as a Centronics interface, or via network communication means.

At the host computer, application software such as a word processor or spreadsheet runs on a so-called basic operating system such as Windows (the registered trademark of Microsoft Corporation). If printing is performed using the application software, the program implements printing using a graphic subsystem, which is one of several subsystems provided by the basic operating system.

The graphic subsystem, which is called GDI (Graphic Device Interface) in the Windows environment, supervises the processing of image information for a display or printer.

In order to compensate for dependency upon the particular device, such as a display or printer, the GDI dynamically links modules referred to as device drivers and executes output processing in regard to each device. The module for a printer is referred to as a printer driver. With a printer driver it is necessary to prepare a group of functions referred to as a DDI (Device Driver Interface) whose inclusion in the device driver is decided beforehand depending upon the capabilities and functions of the printer driver. In regard to the calling of an API (Application Programming Interface) of application software, the arrangement is such that the GDI performs a data conversion for the device driver, the group of DDI functions of this device driver are called from the GDI as appropriate and the prescribed print processing is executed. The GDI sequentially processes print requests from the application software via the printer driver. The processing of the printer driver can be classified into two types, namely a PDL type and an image type.

The PDL type is suitable for an arrangement in which the printing apparatus is equipped with a controller that is capable of processing a control command referred to as PDL (Printer Description Language). The processing involved is mainly processing for converting the DDI, which is delivered from the system, to a PDL command.

The image type, on the other hand, does not execute highly sophisticated plot processing on the side of the printing apparatus but rather expands print images on the side of the printer driver and sends the images to the printing apparatus so that they may be printed.

In processing for printing text, for example, the PDL-type processing mode performs printing by utilizing fonts incorporated in the printing apparatus or allocates IDs specific to character patterns expanded as necessary on the side of the printer driver in advance, first registers the character patterns on the side of the printing apparatus and then prints the characters based upon print position information and ID.

With the image-type processing mode, the printer driver possesses a plotter memory which stores data in band or full-page units, and characters are expanded in this memory. When one band or a full page of plot processing ends, the content of the plotter memory is transferred to the printing apparatus as image data and the prescribed image is printed out.

The prior art includes an arrangement in which the PDL and image types are utilized exclusively in one printer driver. In general, which should be utilized is decided by the user per se depending upon the content of the document to be printed, and the setting is made using the interface (referred to as a "user interface" below) of the printer driver.

The example of the prior art cited above has a number of problems.

(1) There are instances where it is difficult for the user to decide the optimum processing mode (PDL or image) from the content of a document.

Generally, the PDL processing mode is possible to process plain text data in high speed compared with the image processing mode.

However, the high speed performance of the PDL processing mode is not necessarily secured, because the processing performance depends on the contents of data.

For example, in case of a high resolution image such as a photograph taking up the entire side of a sheet of paper and having characters written thereon (see FIG. 3), it is highly likely that processing will be executed at higher speed by the image driver. That is, the processing time needed to obtain a printed result, which depends upon the size of the area plotted, whether there is a background beneath the characters and whether the document consists of a plurality of pages (i.e., whether or not there is a hit in the font cache), differs greatly depending upon the type of driver operation.

The image takes up the full side of a sheet of paper in the case of printing as shown in FIG. 3. Even if text separation processing is performed and the characters are cut from the document separately and processed as PDL in this case, there is an increase in the commands and textual data that are required for processing the characters as PDL. As a result, there is an increase in the overall print data and it is necessary to execute two kinds of processing, namely image plotting and text printing. The result is significant overhead from the standpoint of amount of processing.

In the case of such a full-page image, the superior choice is the image-type printer driver, in which characters also are pasted on the image expanded on the host side and the entirety is sent to the printer as an image.

(2) Allowing the user to select the optimum processing mode leads to ever more complicated user interfaces for the printer driver and is likely to lead to greater confusion for the user. Even in a case where it is attempted to lighten user load in regard to setting different conditions by allowing the setting of these conditions to be represented by icons, as shown in FIG. 4, there is still the danger that the user will be confused if a greater number of various printing modes is provided.

(3) A method that has been considered to solve the problems that arise when the selection is made by the user involves storing DDI information temporarily as a file and having the printer driver itself analyze this information to thereby precisely determine the optimum processing mode. However, storing the DDI information temporarily as a file takes time, with the likelihood that performance will decline.

(4) In order to precisely determine the optimum processing mode, it is necessary to ascertain the correlation (extent of overlap) among plot objects. If there is a very large number of plot objects, the processing for detecting them will instead lead to greater overhead and may make the desired result unobtainable.

(5) When the degree of overlap between text and other plot objects is examined, ascertaining pattern overlap in the plotter memory is processing executed in units of pixels. Detection processing in pixel units leads to greater overhead and may make the desired result unobtainable.

For example, in a case where characters ABC, an ellipse having a hatched pattern and a single slanted line have been drawn closely together, as illustrated in FIG. 5, it is difficult to precisely ascertain the degree of overlap, if any. In such case, the conventional practice is to discriminate degree of overlap based upon information referred to as a "font boundary box", which encloses the character string in the manner indicated by the dashed-line box shown in FIG. 5. In such case, however, taking FIG. 5 as an example, despite the fact that there actually is no overlap between the rendered patterns of the respective objects, the result of area discrimination is that overlap exists (because the hatched portion and the dashed-line box are found to overlap).

In general, the prior art is such that the PDL- and image-type drivers are switched between on a print-job basis. However, a hybrid scheme in which these two types of drivers are used properly on a per-object basis in dependence upon the content of the print data also has been considered. However, the following problems arises when implementing a hybrid scheme of this kind:

(6) In a hybrid scheme, the components of both the PDL- and image-type drivers are combined. However, with the image-type implementation, for example, there are many cases where a banding approach is adopted from the viewpoint of using memory efficiently. In an instance where text is printed with such an arrangement, a DDI call for printing text takes place twice for characters that bridge bands even through characters are processed in PDL. More specifically, as illustrated in FIG. 6, a DDI call that clips the upper half of a character and expands it in an initial band is generated, then the lower half of the character also is clipped and this half is rendered in the next band. This form of processing is the same regardless of whether a driver is of the image type or PDL type because the processing step occurs at the processing stage of the DDI call. The processing of a character that spans bands in this manner invites a decline in processing speed because the printing of one character requires four steps (① the setting of a clipping area in band n, ② the expansion of the character pattern, ③ the setting of a clipping area in band n–1 and ④ the expansion of the character pattern).

SUMMARY OF THE INVENTION

First, in regard to problem (1) cited above, whether a character to be printed has background is a key point when performing area discrimination.

In regard to problem (2), a preferred arrangement is one having an autonomous decision mechanism in which, in principle, the driver itself, rather than the user, makes decisions and printing processing is executed by the optimum processing method thus decided.

In regard to problem (3), it is desirable to adopt a method in which DDI information is judged sequentially (in real time) whenever it arrives, instead of an n-pass scheme in which DDI information is stored as a file in the first pass and the information in the file is examine to judge the information.

In regard to problem (4), it is preferred that processing speed be given priority consideration over strictness in terms of degree of overlap at the dot level in view of the fact that the gist of the present invention is an improvement in performance. Thus a scheme that makes judgments using information relating to a rectangle circumscribing a character string is desired.

In regard to problem (5), if a condition can be imposed to the effect that a character that has been cut from a document by text separation processing will not have any background, then, when printing is performed in PDL, there will no longer be the need for clipping and it will be possible to eliminate the second cycle of printing processing.

The present invention solves the above-mentioned problems mainly by the arrangements described below by taking into account the aforesaid methods of dealing with these problems.

Specifically, the present invention provides a printing system constituted by a printing apparatus and a data processing apparatus capable of communicating with the printing apparatus via a prescribed communications medium, the system comprising: print information generating means for generating print information, which is to be printed by the printing apparatus, in response to a print request command; area information registration means for registering, in a registration area, coordinate information of a plotting area of a print object generated as the print information; and area discrimination means for comparing the coordinate information registered by the area information registration means with character-string print position information when the character string is printed, and discriminating whether or not these two items of information overlap, wherein type of processing for printing the character string is switched based upon results of discrimination by the area discrimination means.

A print control method according to the present invention comprises: a print information generating step of generating print information regarding a printing apparatus in response to a print request command; an area information registration step of registering, in a registration area, coordinate information of a plotting area of a print object generated as the print information; and an area discrimination step of comparing the coordinate information registered at the area information registration step with character-string print position information when the character string is printed, and discriminating whether or not these two items of information overlap, wherein form of processing for printing the character string is switched based upon results of discrimination.

The present invention further provides a data processing apparatus for outputting print information to a printing apparatus via a prescribed communications medium, comprising: print information generating means for generating print information that is to be printed by the printing apparatus; area information registration means for registering, in a registration area, coordinate information of a plotting area of the print information that has been generated; area information updating means which, when the coordinate information is registered, is for updating the coordinate information as the maximum area that contains the plotting area; and area discrimination means for comparing the coordinate information registered by the area information registration means with character-string print position information when the character string is printed, and discriminating whether or not these two items of information overlap.

The present invention further provides a data processing method for processing print information that is output to a printing apparatus, comprising: a print information generating step of generating print information that is to be printed by the printing apparatus; an area information registration step of registering, in a registration area, coordinate information of a plotting area of the print information that has been generated; an area information updating step which, when the coordinate information is registered, is a step of updating the coordinate information as the maximum area that contains the plotting area; and an area discrimination step of comparing the coordinate information registered at the area information registration step with character-string print position information when the character string is printed, and discriminating whether or not these two items of information overlap.

The present invention further provides a storage medium storing a data processing program for processing print information that is output to a printing apparatus, the data processing program comprising: code of a print information generating step of generating print information that is to be printed by the printing apparatus; code of an area information registration step of registering, in a registration area, coordinate information of a plotting area of the print information that has been generated; code of an area information updating step which, when the coordinate information is updated, is a step of updating the coordinate information as the maximum area that contains the plotting area; and code of an area discrimination step of comparing the coordinate information registered at the area information registration step with character-string print position information when the character string is printed, and discriminating whether or not these two items of information overlap.

The present invention further provides a storage medium storing a print control program, comprising: code of a print information generating step of generating print information, which is to be printed by a printing apparatus, in response to a print request command; code of an area information registration step of registering, in a registration area, coordinate information of a plotting area of a print object generated as the print information; and code of an area discrimination step of comparing the coordinate information registered at the area information registration step with character-string print position information when the character string is printed, and discriminating whether or not these two items of information overlap.

In accordance with a preferred embodiment of the present invention, the printing system described above further comprises first character printing means for printing a character pattern, which has been expanded on the side of the printing apparatus, if there is no overlap in the plotting area of the print object based upon results of discrimination performed by the area discrimination means; and second character printing means for printing a character pattern, which has been expanded by the data processing apparatus, as a bitmap image if there is overlap in the plotting area of the print object based upon results of discrimination performed by the area discrimination means.

In a preferred embodiment of the present invention, the area information registration means performs registration using area information relating to a rectangle circumscribing the plot object.

In a preferred embodiment of the present invention, the area information registration means registers, in the registration area, minimum values of top-left coordinates and maximum values of bottom-right coordinates of a rectangle circumscribing each plot object that is possibly background of text.

In a preferred embodiment of the present invention, the area discrimination means performs discrimination processing sequentially based upon print information generated sequentially in the print information generating means.

In a preferred embodiment of the present invention, the print information generating means generates print information that has been rasterized in units obtained by partitioning one page into a plurality of band areas.

In a preferred embodiment of the present invention, the print information generating means executes processing upon virtually connecting the plurality of band areas to expand them as one area in a case where a plotting area of a print object relating to a character bridges a plurality of the band areas according to the result of discrimination by the area discrimination means.

In a preferred embodiment of the present invention, the area information registration means and the area discrimination means perform registration and discrimination upon partitioning and managing a band area in the print information generating means as a plurality of sub-areas.

In a preferred embodiment of the present invention, the area information registration means saves, in the registration area, coordinate-value information which defines the maximum rectangular area that contains all print objects.

In a preferred embodiment of the present invention, the registration area has: a flag portion for identifying an attribute of the plotting area of the print object; a parent-area portion for identifying a parent area when the plotting areas are connected; a management area for saving coordinate information of the print object; and a registration area for saving area information of background of the print object.

In a preferred embodiment of the present invention, if the area discrimination means has discriminated overlap between an area of a character string processed as PDL and coordinate information of a subsequently entered print object which is background of the character string, the area discrimination means sets an image assurance flag for identifying the overlap and, after the image assurance flag has been set, subjects all print objects to print processing by the first character printing means, thereby eliminating inconsistency of printed results due to advance in the plotting order of the print objects.

In a preferred embodiment of the present invention, the printing system further comprises holding means for holding, on the side of the data processing apparatus, print information of a character string processed as PDL in the band area, wherein if the area discrimination means has discriminated that the area of the character string processed as PDL and coordinate information of a subsequently entered print object which is background of the character string overlap, the area discrimination means calls the print information of the character string being held by the holding means, performs expansion in a plotter memory by the data processing apparatus based upon the print information of the character string, and updates the coordinate information of the plotting area, which has been registered in the registration area, as well as the print information of the character string, thereby eliminating inconsistency of printed results due to advance in the plotting order of the print objects.

In accordance with a preferred embodiment of the present invention, the printing control system described above further comprises a first character printing step of printing a character pattern, which has been expanded by the printing apparatus, if there is no overlap in the plotting area of the print object based upon results of discrimination performed at the area discrimination step; and a second character printing step of printing a character pattern, which has been expanded by the data processing apparatus, as a bitmap image if there is overlap in the plotting area of the print object based upon results of discrimination performed at the area discrimination step.

In a preferred embodiment of the present invention, the area information registration step performs registration using area information relating to a rectangle circumscribing the plot object.

In a preferred embodiment of the present invention, the area information registration step registers, in the registration area, minimum values of top-left coordinates and maximum values of bottom-right coordinates of a rectangle circumscribing each plot object that is possibly background of text.

In a preferred embodiment of the present invention, the area discrimination step performs discrimination processing sequentially based upon print information sequentially generated at the print information generating step.

In a preferred embodiment of the present invention, the print information generating step generates print information that has been rasterized in units obtained by partitioning one page into a plurality of band areas.

In a preferred embodiment of the present invention, the print information generating step executes processing upon virtually connecting the plurality of band areas to expand them as one area in a case where a plotting area of a print object relating to a character bridges a plurality of the band areas according to the result of discrimination at the area discrimination step.

In a preferred embodiment of the present invention, the area information registration step saves, in the registration area, coordinate-value information which defines the maximum rectangular area that contains all print objects.

In a preferred embodiment of the present invention, the registration area has: a flag portion for identifying an attribute of the plotting area of the print object; a parent-area portion for identifying a parent area when the plotting areas are connected; a management area for saving coordinate information of the print object; and a registration area for saving area information of background of the print object.

In a preferred embodiment of the present invention, if the area discrimination step has discriminated overlap between an area of a character string processed as PDL and coordinate information of a subsequently entered print object which is background of the character string, the area discrimination step sets an image assurance flag for identifying the overlap and, after the image assurance flag has been set, subjects all print objects to print processing by the first character printing step, thereby eliminating inconsistency of printed results due to advance in the plotting order of the print objects.

In a preferred embodiment of the present invention, the printing control system further comprises a holding step of holding, in a memory on the side of the data processing apparatus, print information of a character string processed as PDL in the band area, wherein if the area discrimination step has discriminated that the area of the character string processed as PDL and subsequently entered coordinate information of a print object which background of the character string overlap, the area discrimination step calls the print information of the character string being held in the memory, performs expansion in a plotter memory on the side of the data processing apparatus based upon the print information of the character string, and updates the coordinate information of the plotting area, which has been registered in the registration area, as well as the print information of the character string, thereby eliminating inconsistency of printed results due to advance in the plotting order of the print objects.

In a preferred embodiment of the present invention, the area discrimination means performs discrimination processing based upon print information without spooling.

In a preferred embodiment of the present invention, the area discrimination step performs discrimination processing based upon print information without spooling.

In a preferred embodiment of the present invention, the code of area discrimination step performs discrimination processing based upon print information without spooling.

It should be noted that, as a general rule, the present invention holds with the following assumption as a condition, and that a correctly printed result will be assured under this limited precondition (though this is a general rule at best; a way of coping with instances where the rule is violated will be described later in conjunction with a third embodiment): The precondition is that a plot object which is the background of a character contains the character, and that the DDI of a plot object constituting background is called before a text printing DDI at the time of print processing. Further, a plot object of the kind for which a logical operation is performed on a character is not drawn.

For example, in a case where printing of the kind shown in FIG. 7A is performed, the character string "File Name" has background. Characters in a case such as this are subjected to image-type processing without being cut out as characters to be processed in PDL. The discrimination method used at this time will be described in simple terms with reference to FIG. 7B. In an ordinary printed document, the background of a character string having such background surrounds the character string. In such case print commands which the system delivers to the printer driver also are processed in order starting from the information of the plotting area.

More specifically, in the case of FIG. 7B, first a ruled line (a straight line) of a table constituting background is delivered as a rectangular image to the printer driver by a DDI call DrvBitBlt (①). At this time the printer driver first registers, in prescribed area information storage means, two items of coordinate information, namely the point (point A) at the top left of this plot object (a rectangle in this case) and the point at the bottom right (point B, which, since this is a rectangular image of a straight line, is the point at the extreme right end of the straight line).

Next, a portion (rectangular) that is a hatched part of the table is delivered to the printer driver by a DDI call DrvBitBlt (②). Here also two items of coordinate information, namely the top-left point (point A) and bottom-right point (point C) of this rectangular area are registered in the prescribed area information storage means by area information registration means. However, this information is compared with the area information already registered, and a smaller value in the top-left direction and a larger value in the bottom-right direction are registered. In other words, the area information managed by the area information storage means is always taken as two points in this case.

The area information is referred to in this manner for each plot object so that the largest rectangular area that will contain these plot objects may always be ascertained. If the next item arrived at under these conditions is a character string, it is determined whether there is overlap between information relating to a circumscribing rectangle that contains the character string and a rectangular area registered by the area information registration means thus far.

If there is even slight area overlap, it is judged that the character string includes background and, hence, the character string is subjected to processing of the image type. For example, in regard to "File Name" (③), a rectangular area defined by A' and C' and the hatched portion of ② overlap.

On the other hand, if the result of area discrimination is that there is no overlap (e.g., the character-string portion "Tag.1" in FIG. 7B), this character string is subjected to processing of the PDL type. This makes it possible to instantly judge the optimum processing means at all times.

The foregoing is the principle of operation of the inventive means for solving the aforementioned problems. These means solve the problems of the prior art, make it possible to shorten the time needed for printing processing and provide a transition from operating mode decisions made by the user to autonomous operating mode decides made by the printer driver. As a result, it is no longer necessary to make settings through a complicated user interface, thereby improving operability for the user.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a conceptual view showing an example of a print image and a difference in generated codes described in regard to the problems of the prior art;

FIG. 9 is a diagram showing an example of a program in C language for area registration processing;

FIG. 10 is a diagram showing an example of a program in C language for area discrimination processing;

FIG. 11 is a diagram showing an example of a program in C language for text printing DDI processing;

FIG. 12 is a diagram showing an example of a print image in which desired effects cannot be expected in a first embodiment;

DESCRIPTION OF THE PREFERRED EMBODIMENTS

<First Embodiment>

Figure 1:
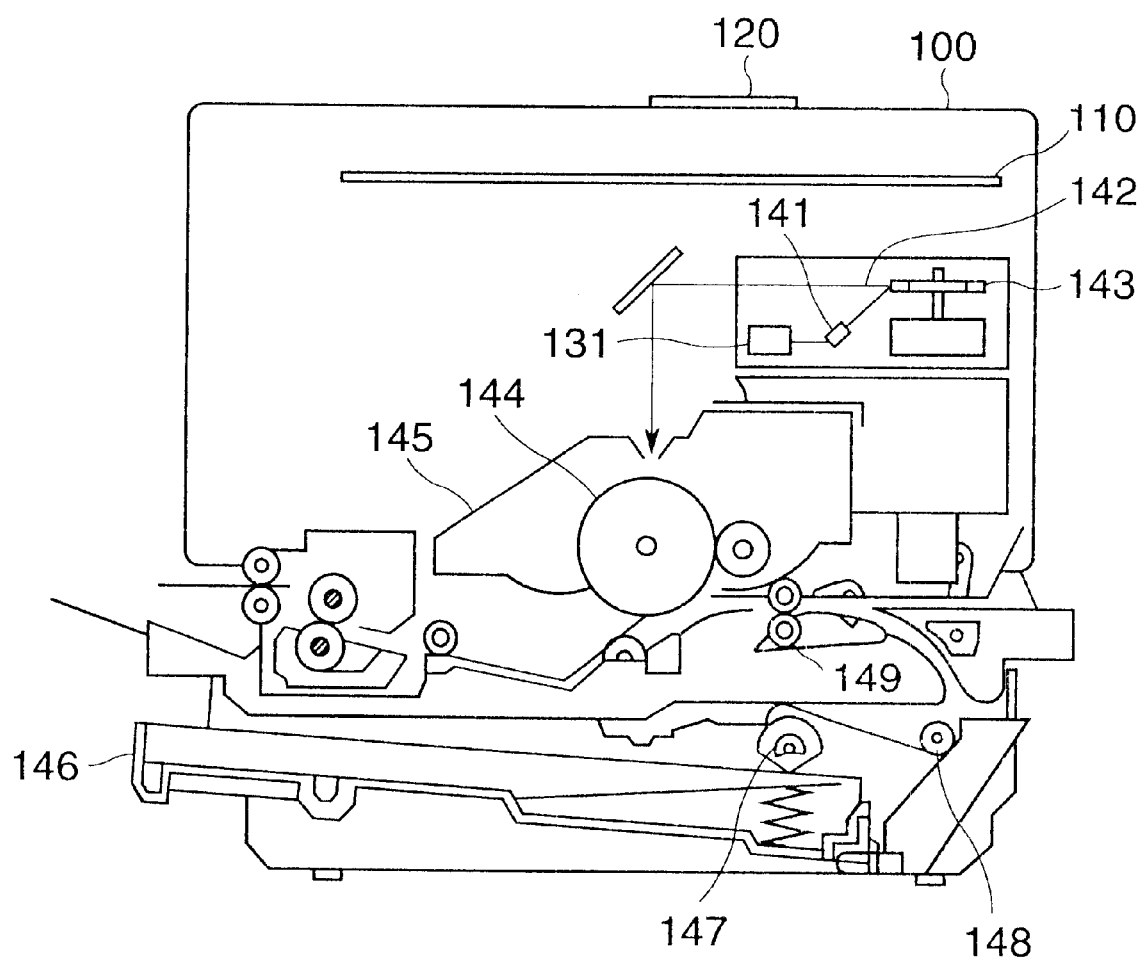
FIG. 1 is a sectional view showing the structure of a laser printer to which the present invention is applicable.

Before describing the construction of the present invention, we will discuss the structure of a laser printer, which performs the printing of a printing system to which the present embodiment is applied, with reference being had to FIG. 1.

FIG. 1 is a sectional view showing the structure of a laser printer. As shown in FIG. 1, the laser printer has a body 100. Print information comprising print data (character codes, image data, etc.) and control codes supplied by an externally connected host computer are input to and stored in the laser printer, which proceeds to create the corresponding print image data and print images in accordance with this information and form an image on printing paper serving as a storage medium.

The laser printer has an operation panel 120 on which operation switches and LED indicators are arrayed, and a formatter controller 110 for controlling the laser printer and for executing printing processing upon analyzing textual information and the like supplied from the host computer. Print information that has been expanded in the formatter controller 110 is converted to a video signal of the corresponding pattern and the video signal is output to a laser driver 131. The laser driver 131 is a circuit for driving a semiconductor laser 141. A laser beam 142 emitted by the semiconductor laser 141 is switched on and off in dependence upon the entered video signal.

The laser beam 142 is swept back and forth by a rotating polygonal mirror 143 so as to scan and expose an electrostatic drum 144. As a result, an electrostatic latent image of a character pattern is formed on the electrostatic drum 144. The latent image is developed by a developing unit 145 surrounding the electrostatic drum 144, after which the developed image is transferred to printing paper. Cut sheets are used as the printing paper and are stored in a paper cassette 146 that has been loaded in the laser printer 100. The printing paper is fed into the apparatus by a feed roller 147 and transport rollers 148, 149 so as to be supplied to the electrostatic drum 144. Here transfer to the printing paper takes place so as to form the image.

The body 100 of the laser printer is equipped with one or more card slots (not shown) or memory slots (not shown) in which a memory such as a flash ROM is inserted. This makes it possible to connect an option font card, which provides fonts to supplement internal fonts, as well as a control card (emulation card) of a different language system (command scheme).

Figure 2:
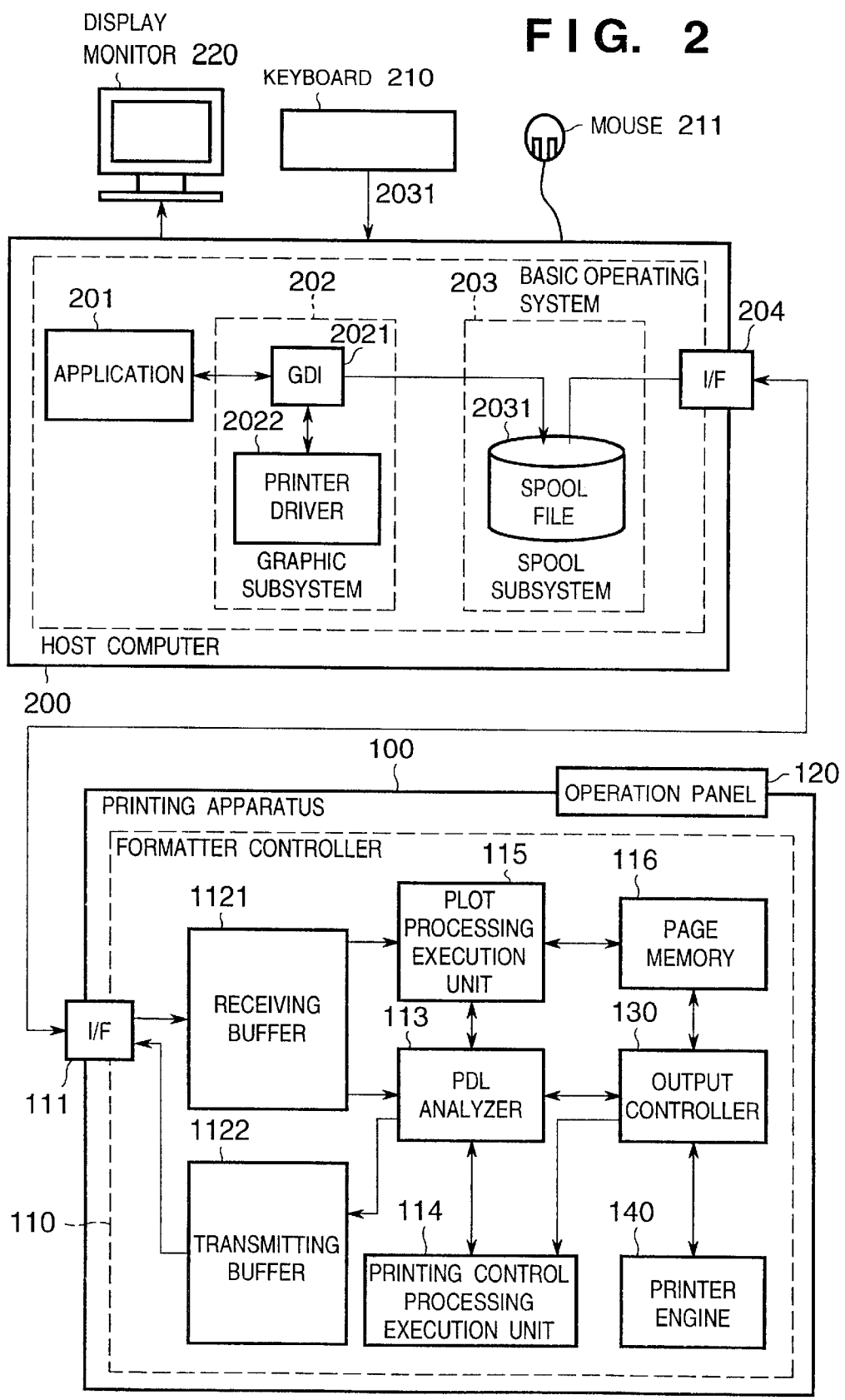
FIG. 2 is a block diagram showing the basic overall configuration of a printing system according to an embodiment of the present invention.
Figure 4:
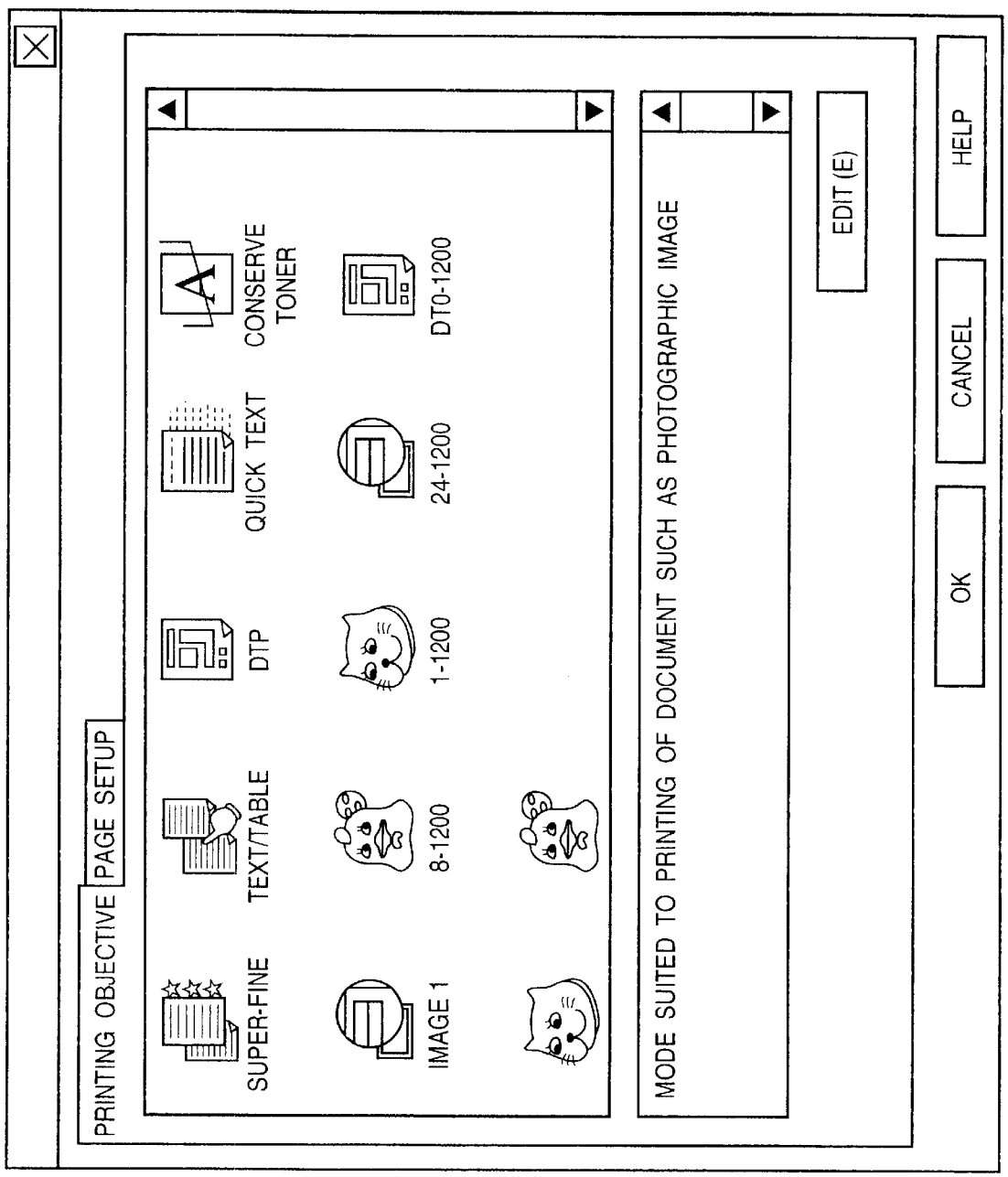
FIG. 4 is a diagram showing an example of the user interface of a printer driver.
Figure 5:
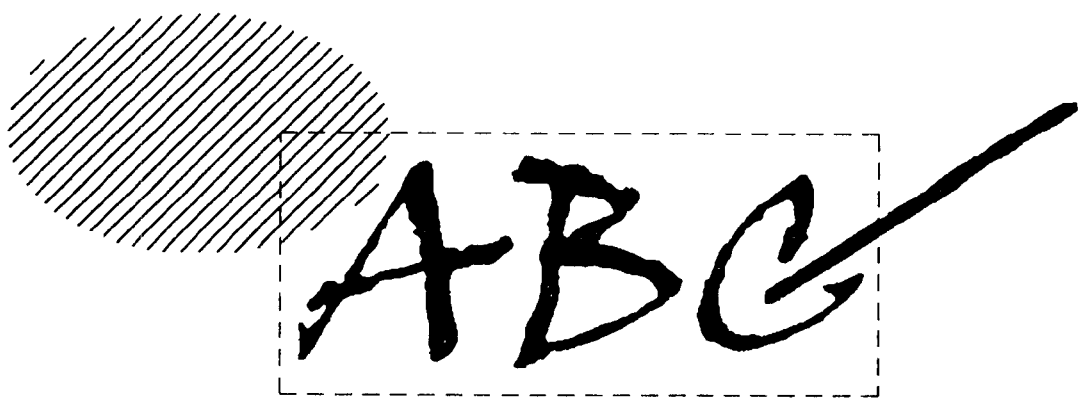
FIG. 5 is a diagram showing an example of a print image.
Figure 6:
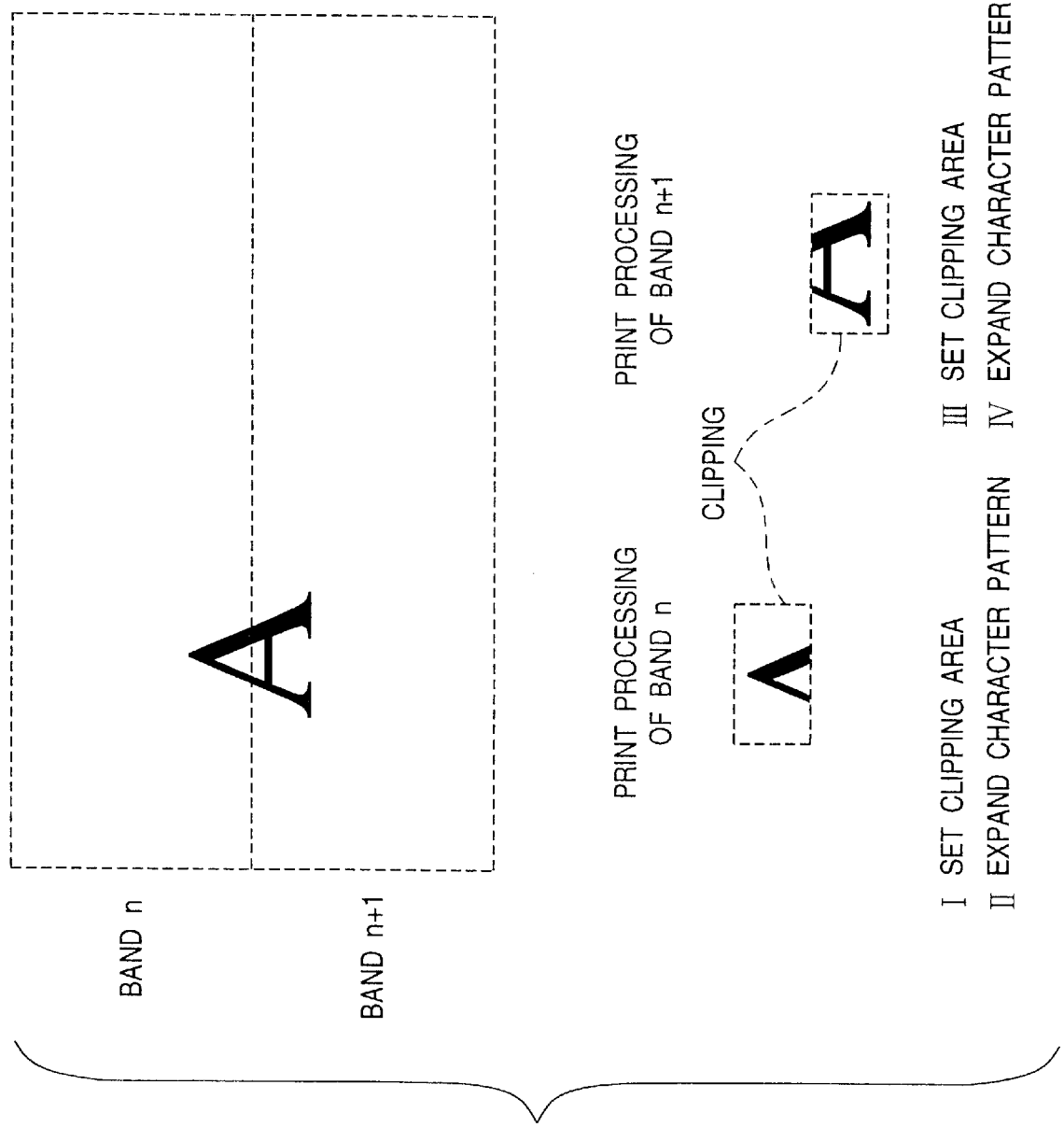
FIG. 6 is a conceptual view useful in describing processing when printing a character that bridges bands.

The printer to which the present invention can be applied is not limited to a laser printer, and it goes without saying that the printer may be a color laser printer or a printer that relies upon another printing technique, such as a ink-jet printer. FIG. 2 is a block diagram showing the basic overall configuration of a printing system embodying the present invention.

The formatter controller 110 of the printing apparatus 100 includes an interface (I/F) 111 serving as means for connecting the apparatus to a host computer 200, a receiving buffer 1121 for temporarily retaining and managing received data, a transmitting buffer 1122 for temporarily retaining and managing transmitted data, a PDL analyzer 113 for supervising the analysis of print data, a printing control processing execution unit 114, a plot processing execution unit 115 and a page memory 116, etc.

The interface 111, which serves as communications means for sending data to and receiving data from the host computer 200, is capable of communication in compliance with IEEE-1284 as the communications protocol. Print data received through the interface 111 is accumulated sequentially in the receiving buffer 1121, which serves as storage means for temporarily retaining this data, and the print data is read out and processed as necessary by the PDL analyzer 113 or plot processing execution unit 115. The PDL analyzer 113 is constituted by a control program that is in compliance with each PDL command scheme and print-job control language. A command that has been analyzed by the PDL analyzer 113 instructs the plot processing execution unit 115 to process the result of analyzing print data relating to the printing of characters and the plotting of graphics and images. Commands other than those for plotting, such as commands for paper-feed selection and reset, instruct the printing control processing execution unit 114 to execute processing.

The plot processing execution unit 115 sequentially expands text and image objects in the page memory 116. Further, when encoded image data is decoded and expanded in the page memory, the plot processing execution unit 115 executes data decoding processing. The page memory 116 may be managed based upon this expansion processing and stores print data which is sent as video signals to the printer engine. In other words, the page memory 116 may be managed by banding control. If there is enough memory, an area in which one page is capable of being expanded may be reserved. In general, the formatter controller 110 is constituted by a computer system composed of a central processing unit (CPU), a read-only memory (ROM) and a random-access memory (RAM), etc. The processing executed by the above-mentioned units may be time-share link processing executed under a multitask monitor (real-time operating system), or the processing may be executed independently by preparing special-purpose controller hardware for each function.

The operation panel 120 is for setting and displaying various states of the printing apparatus. An output controller 130 converts the content of the page memory 116 to a video signal and transfers images to a printer engine 140. The printer engine 140 is a printing mechanism for forming a received video signal into a permanent visible image on printing paper and is as described above in connection with FIG. 1. The paper cassette 146 is a removable device for storing paper.

The printing apparatus 100 is as described above. Described next will by the overall configuration of a printing system according to this embodiment, which includes the host computer 200.

If the functions of the present invention are executed, the present invention can be applied to a stand-alone device or to a system comprising a plurality of devices which execute processing via a network such as a LAN.

In FIG. 2, the host computer 200 serving as a data processing apparatus in the printing system outputs print information comprising print data and control codes to the printing apparatus 100. The host computer 200 is constructed as a computer system having a keyboard 210 serving as an input device, a mouse 211 serving as a pointing device, and a display monitor 220 serving as a display device. It is assumed that the host computer 200 is operated by a basic operating system such as Unix or Windows. If attention is directed solely to the inventive functions provided at the host computer, the functions on the basic operating system can be classified broadly into the functions of application software 201, a graphic subsystem 202, which serves an image information processing means, and a spool subsystem 203, which includes data storage means, print-data storage control means and communication means for communication with the printing apparatus.

The application software 201 refers to applications software, such as a word processor or spreadsheet, that is run on the basic operating system. The graphic subsystem 202 is constituted by a Graphic Device Interface (referred to as a "GDI" below) 2021, which is one of the functions of the basic operating system, and a printer driver 2022 serving as a device driver linked dynamically from the GDI.

The component referred to as the printer driver is print information generating means according to the present invention. The spool subsystem 203, which is a subsystem specific to a printer device and is situated downstream of the graphic subsystem 202, includes devices such as a spool file (a hard disk in actuality) 2031 serving as data storage means. Depending upon the type of basic operating system, the device names and functional framework mentioned above may differ. However, if the devices are modules in which the various technical means of the present invention can be implemented, the names and functional framework thereof do not have that much significance as far as the present invention is concerned. For example, what is referred to as a spooler or spool file can be implemented by incorporating the processing in a module called a print queue in a different operating system.

In general, the host computer 200 that includes these functional modules consists of such hardware as a CPU, a ROM, a RAM, a hard-disk drive (HDD) and various input/output (I/O) units. Software referred to as basic software supervises control of this hardware, and respective application software subsystem processes operate as functional modules under this basic software.

The components that construct the present invention have been described on the basis of FIGS. 1 and 2. The operation of the present invention will now be described with reference to the flow of processing in conjunction with FIG. 8.

Figure 7A:
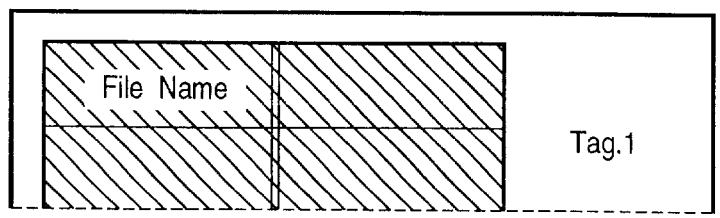
FIGS. 7A and 7B are schematic views of plot objects expanded in bands.
Figure 7B:
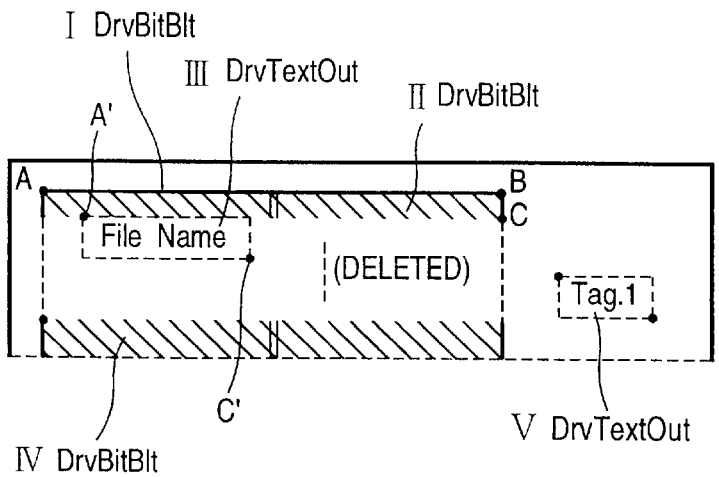
Figure 8:
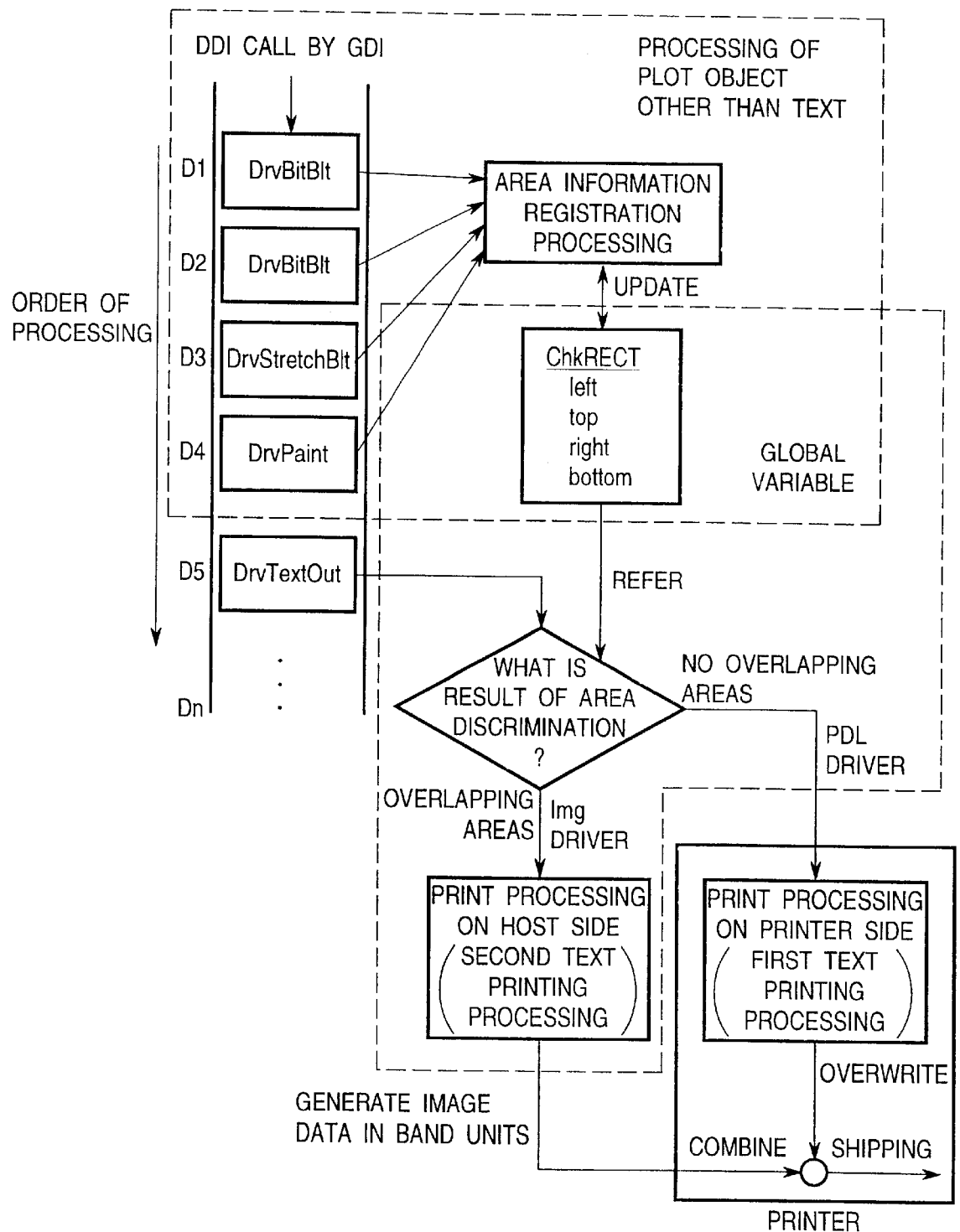
FIG. 8 is a conceptual view showing the flow of processing.

FIG. 8 is a conceptual view showing the flow of processing according to the present invention. The flow of processing will be described taking as an example a case in which printing of the kind shown in FIG. 7A is performed. FIG. 7B shows the print image of an initial band area of data composed of a table of the kind often used in spreadsheet software and a character string indicating numbers in the table.

First a ruled line (a straight line) of the table constituting background is delivered as a rectangular image to the printer driver by a DDI call indicated by DrvBitBlt (D1). At this time the printer driver first delivers two items of coordinate information, namely the point (point A) at the top left and the point (point B) at the bottom right of this plot object (a rectangle in this case because despite the fact that the object appears to be a straight line, it has thickness and therefore is rectangular in shape) to an area-information registration processor, which then processes the coordinate information. The area-information registration processor, which is area information registration means according to the present invention, exists as software within the printer driver and registers the delivered rectangle information (top left and bottom right) to a prescribed area information storage area.

This area information storage area exists as a global variable within the printer driver and is also initialized whenever a band is updated. Since the plot object of D1 is the first plot object in the band, the area information of D1 is registered as is. For area registration from this point onward, registration is managed on each occasion based upon a comparison with information that has been registered thus far. Area information registration processing is executed by referring to and updating ChkRECT, which is a global variable area for area management.

Specifically, as shown in FIG. 9, area TrgRECT of the plot object of interest and ChkRCT are compared, values smaller than the top-left coordinate values and values larger than the bottom-right coordinate values are sought, and the ChkRECT variable is updated by these values. In other words, the largest rectangular area in which several print objects of interest are contained is calculated. While the above-described area registration processing is being executed, the area information of the text printing DDI up to just before the arrival of the DDI is examined.

For example, a portion (rectangular) that is a hatched part of the table is delivered as the print object that follows D1 to the printer driver by a DDI call indicated by DrvBitBlt (②). Here also two items of coordinate information, namely the top-left point (point A) and bottom-right point (point C) of this rectangular area are delivered to the area information processor by the area information registration means. This information is then processed. If in this flow of processing a character string arrives next in a state in which several plot objects that might possibly constitute background of characters have been processed, area discrimination processing is executed to determine whether there is overlap between information relating to a circumscribing rectangle that contains the character string and a rectangular area registered by the area information registration means thus far.

In other words, area discrimination processing for determining whether there is even slight overlap of an area that has been stored in the previously registered and updated ChkRECT variable is executed. Specifically, this area discrimination processing is implemented by a program of the kind shown in FIG. 10.

If the processor of the DDI for text printing is expressed by more concrete program code, the result is as shown in FIG. 11. If the result of the above-described area discrimination processing is that a print object to be processed overlaps ChkRECT even slightly, then this text printing processing is executed by the plot processing execution unit on the side of the host computer. (This is second text printing processing.) On the other hand, if there is no overlap with ChkRECT, then the text printing processing performs a conversion to PDL code within the printer driver and the code is allocated in such a manner that actual printing processing is carried out by the plot processing execution unit on the printer side. (This is first text printing processing.)

The band of image data for which plot processing has been executed on the host side is expanded in the plotter memory on the printer side, and textual data that has been sent to the plotter memory as PDL code is subjected to printing processing. However, since the character pattern processed as PDL code and the area for which plot processing has been executed on the host side do not overlap, there will be no change in the result of the final printed image output even if the processing sequence is reversed. Thus, reversing the processing sequence does not lead to any problems.

In accordance with the present embodiment, it becomes possible for a printer driver to decide optimum processing means autonomously and instantly at all times.

<Second Embodiment>

In the first embodiment set forth above, the focus of the description is the basic mechanism of processing according to the present invention. In order to utilize the present invention in more practical areas, it is preferred that the processing described next be adopted. The reason for this is that it is surmised that the desired effects will not be obtained when printing of the kind shown in FIG. 12 is processed according to the first embodiment. Specifically, in a case where a document is mainly text and there is no text background such as patterns or images, higher speed usually is obtained with PDL-type processing.

However, if the area discrimination method of the first embodiment is applied to a situation where two vertical lines have been provided on a document, one on the right side and one on the left side, for reasons of design, the entire textual data portion between the two vertical lines also undergoes image-type processing. Since the area that will be registered by area registration processing in such case is the coordinates of the left and right ends of the lines A and B, area discrimination at the time of text printing always decides that there is overlap despite the fact that there is no pattern overlap in actuality. The result is that the entire document is treated as image data, a large quantity of data is sent to the printer and, if the document consists of a plurality of pages, the reutilization of character patterns (whether or not there is font cache hit) is not effective. As a consequence, there is no increase in printing throughput. The second embodiment is intended to deal with the foregoing problem and represents a more practical embodiment.

Figure 13:
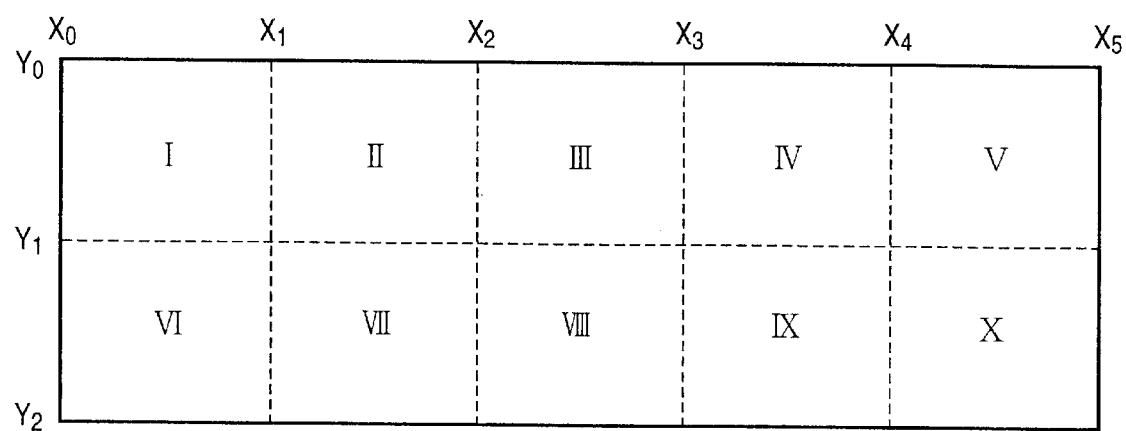
FIG. 13 is a diagram of band areas subjected to partitioning processing according to a second embodiment.

A characterizing feature of the second embodiment is that area management is performed by dividing the area in a band into ten areas of the kind shown in FIG. 13. Adopting this expedient makes it possible to apply text separation processing suitably to a printing scenario of the kind shown in FIG. 12. The flow of processing of this embodiment will be described with reference to the flowchart of FIG. 14.

Figure 14:
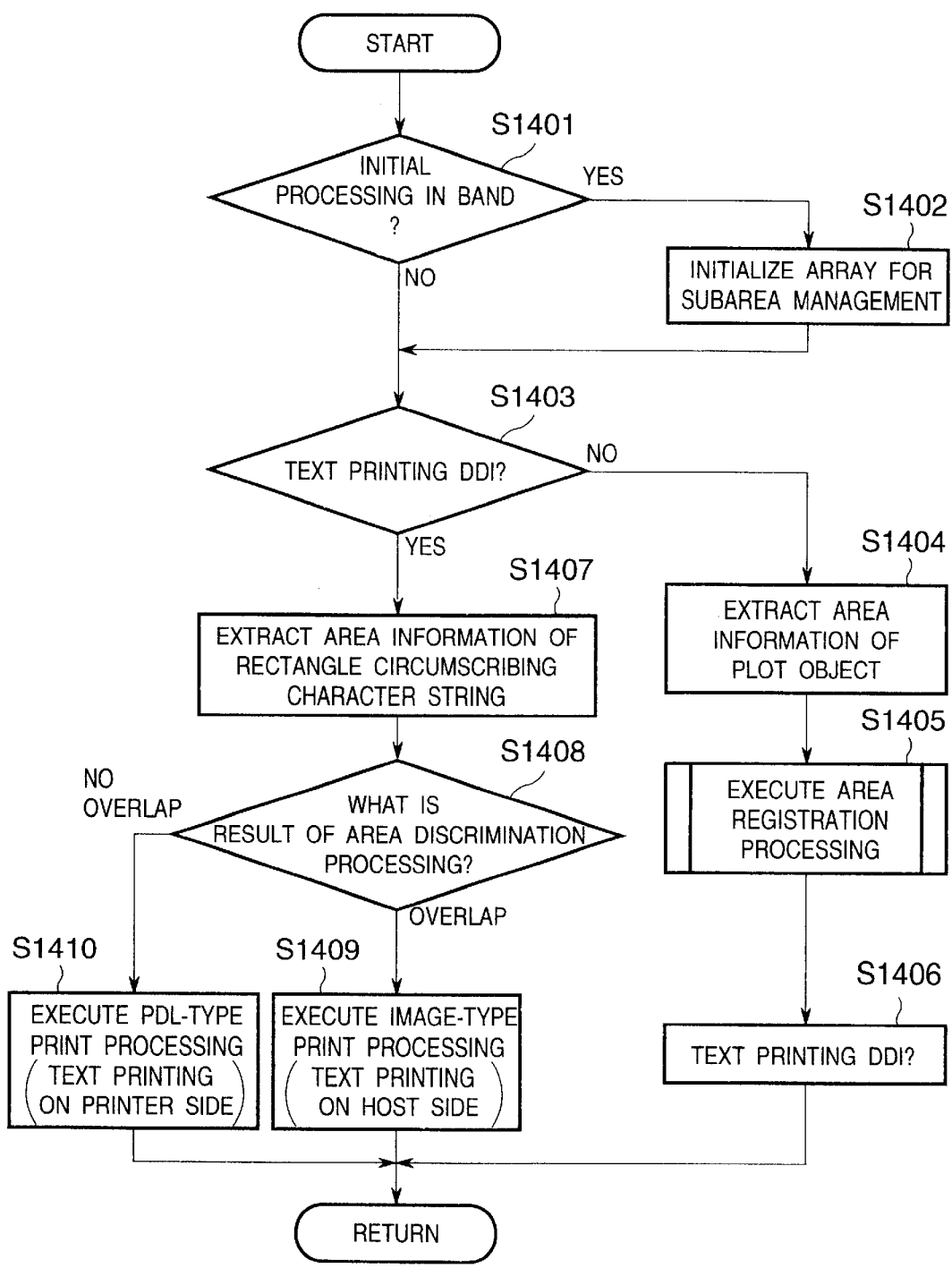
FIG. 14 is a flowchart showing the flow of processing executed by a printer driver.

FIG. 14 is a flowchart showing the flow of processing executed by a printer driver, namely processing executed on the host side of the printing system of the present invention. This processing is composed of steps S1401 to S1410. The printer driver implements a banding scheme with regard to image expansion.

Banding refers to a method of partitioning a page into several portions and generating print information rasterized in the units obtained by partitioning.

Figure 17:
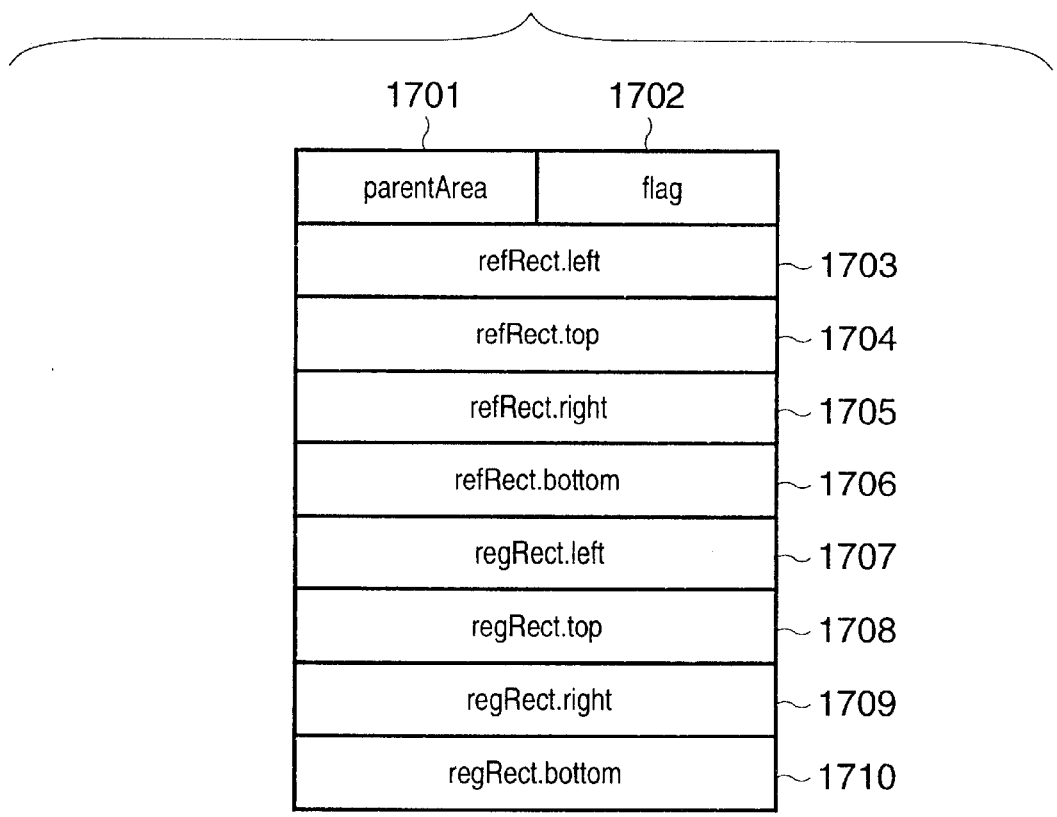
FIG. 17 is a diagram showing a type declaration of a SUB-AREA structure used in the second embodiment.
Figure 18:
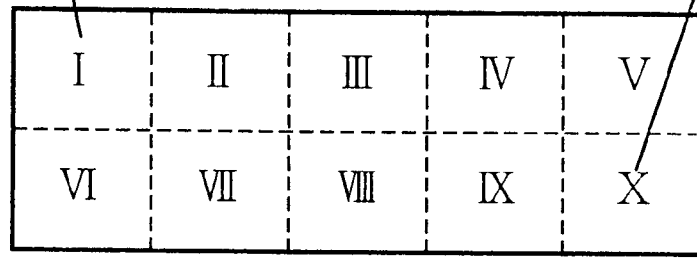
FIG. 18 is a schematic view showing the initial state of an array for sub-area management according to the second embodiment.

First, at step S1401, the printer driver checks to determine whether this is the initial DDI processing in each band. If this is initial processing, initialization processing of the array ChkArea[ ] for sub-area management is executed, this array being a variable that is effective in the processing of this band. The array for sub-area management takes on the values shown in FIG. 18 in the initialized state. The ChkArea[ ] variable is a SUB-AREA-type variable. The SUB-AREA type is defined in the manner shown in FIG. 17.

More specifically, the variable is composed of a flag portion 1702 for identifying whether a plotting area of a partitioned print object is connected, independent or unregistered, a parentArea portion 1701 for identifying an area that becomes a parent when plotting areas are connected, management areas for retaining coordinate information of a print object and registration areas for retaining area information relating to background. The management and registration areas are designated by numerals 1703 to 1710.

Next, it is determined at step S1403 whether the DDI is a text printing DDI. If the decision is "NO", control proceeds to step S1404, where the area information of a rectangle circumscribing this plot object is extracted from each parameter of the DDI. This is followed by step S1405, at which area registration processing is executed using this rectangular area information. Though not illustrated, this area is registered unconditionally in relation to the first print object in the band. The details of area registration processing will be described later. After the area has been registered, plot processing suited to each plot object is executed. The plot processing at step S1406 is the same as that of already existing printer drivers. The flow of processing for plot objects other than text has been described above. Processing in a case where a text printing DDI is discriminated at step S1403 will now be described.

In case of a text printing DDI, control first proceeds to step S1407, at which information relating to a rectangle circumscribing a character string is extracted from each parameter of the DDI. As for the text circumscribing rectangle, which is referred to as a "font boundary box", the graphic subsystem calculates the values thereof in advance and delivers them to the printer driver as DDI parameters. Next, the information relating to the rectangular area circumscribing the character string is compared with the area information relating to plot objects other than text registered thus far. In other words, area discrimination processing is executed at step S1408. The details of area discrimination processing will be described later.

If the result of discrimination processing executed at step S1408 is overlap, then image-type print processing is executed at step S1409. That is, processing for expanding a character pattern in the plotter memory on the host side is executed.

If it is judged that there is no overlap, PDL-type print processing is executed. That is, a font selection instruction and a text printing instruction in which character codes are the parameters are generated on the host side, and processing for expanding character patterns in the plotter memory on the printer side is executed in accordance with these PDL instructions. The general flow of processing executed by the printer driver in the present invention has been described above. The details of area registration processing and area discrimination processing, which are characterizing features of the present invention, will now be described in detail.

Figure 15:
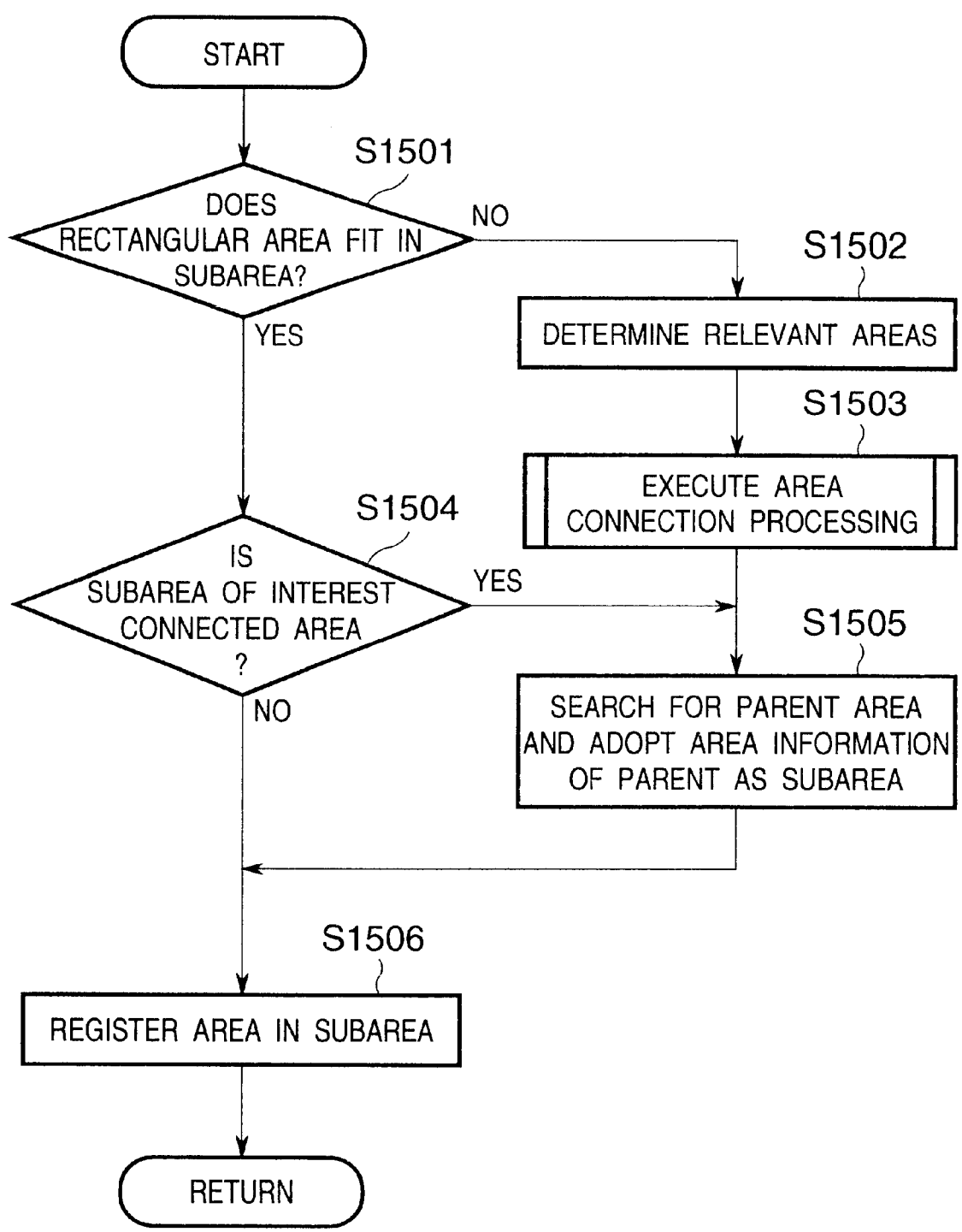
FIG. 15 is a flowchart showing the flow of area registration processing according to the second embodiment.

FIG. 15 is a flowchart showing the flow of area registration processing, which is composed of steps S1501 to S1506. It is determined at step S1501 whether a rectangular area given as an argument in this area registration processing will fit inside one area of the ten sub-areas (see FIG. 13) obtained by partitioning.

Figure 19:
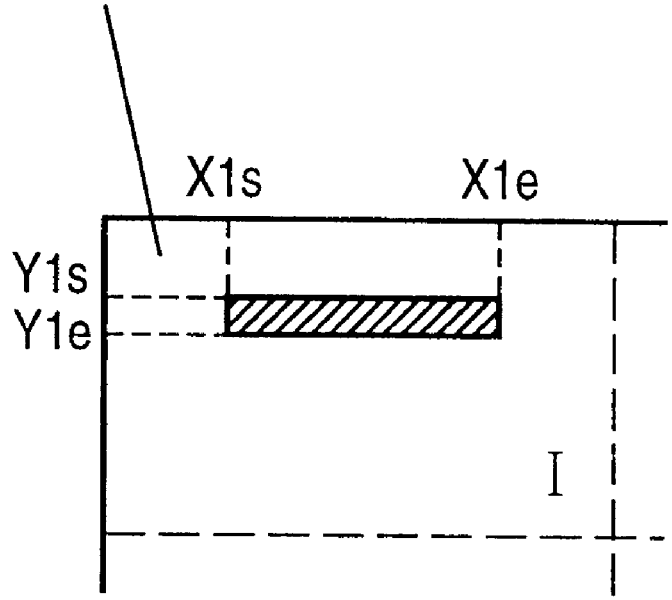
FIG. 19 is a diagram showing the state of an array for management in a case where a rectangular area will fit in a sub-area.

For example, in a case where a straight line of the kind shown in FIG. 19 is drawn, the straight line will fit into sub-area ①. In this case, therefore, control proceeds to step S1504. Here processing is switched upon observing whether the sub-area of interest is an area for which a connection flag (described later) has been set.

If this is a connected area ("YES" at step S1504), control proceeds to step S1505. If the area is an independent sub-area, on the other hand ("NO" at step S1504), then control proceeds to step S1506.

If it is found at step S1501 that the rectangular area will not fit into one sub-area but extends across a plurality of sub-areas, control proceeds to step S1502, where the sub-areas that correspond to these sub-areas numbers are obtained. Next, at step S1503, the relevant sub-areas are connected to construct a new sub-area of larger size.

This enlarged sub-area also is managed by the area ChkArea[ ] variable for sub-area management. The information on the composition of this area is subjected to area connection processing. This processing will be described later.

A sub-area of enlarged size can be produced by gathering several sub-areas together. Area information regarding a new sub-area in which the top-left-most sub-area is the parent sub-area is managed at step S1505. Sub-areas other than the parent sub-area are child sub-areas. In an array for managing the child sub-areas, a flag indicating that sub-areas have been connected is set and an index area of the parent sub-area is stored. In the case of a child sub-area, area information concerning an enlarged new area is not managed and indicates in its entirety a parent sub-area.

The values of the rectangular area delivered to area registration processing is registered in the area information storage area within a sub-area of interest. At the time of registration, smaller coordinate values at the top left and larger coordinate values at the bottom right are obtained by processing for making a comparison with already stored area information, and variables are updated by these values, as described in the first embodiment, at step S1506.

Figure 16:
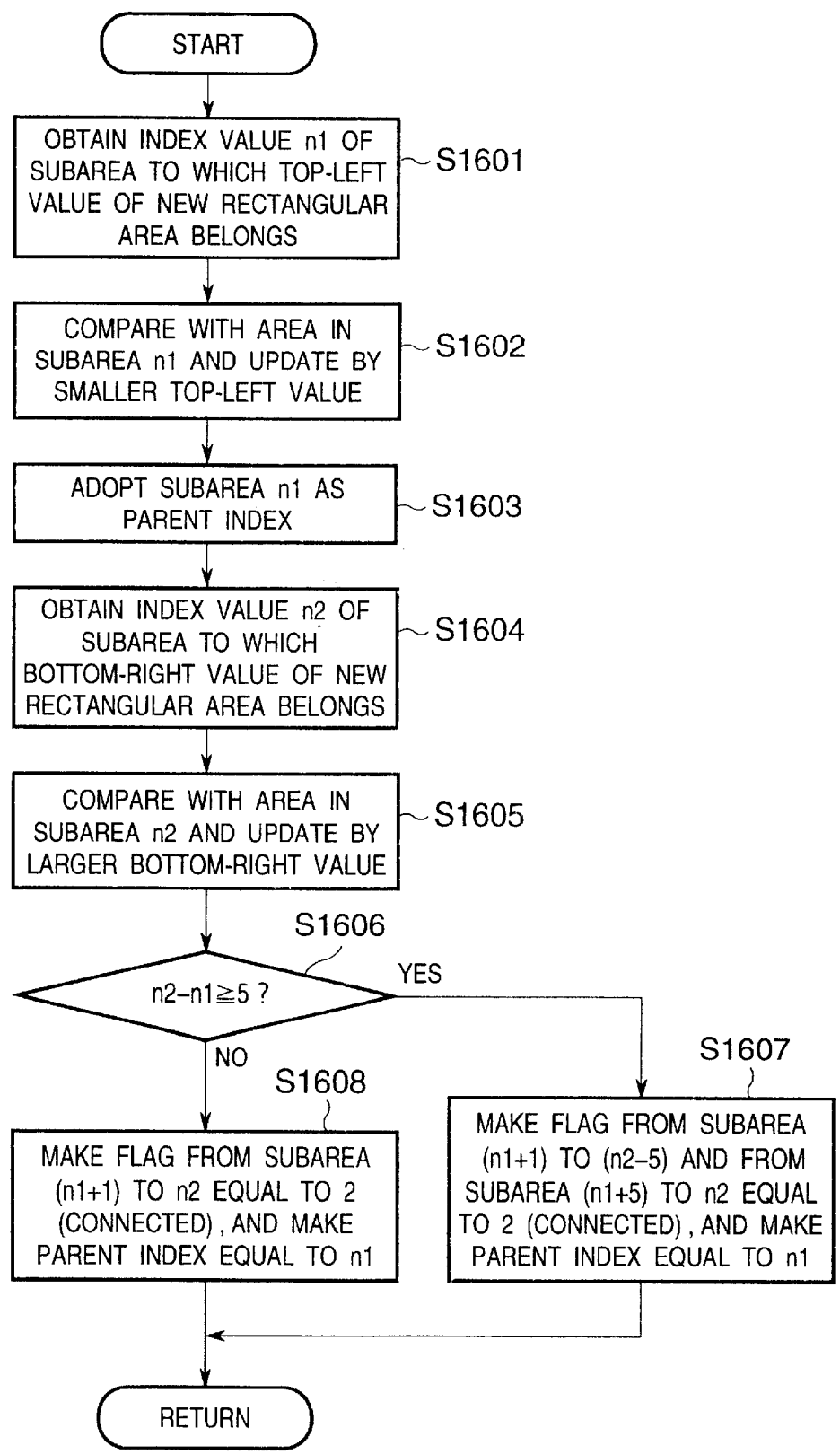
FIG. 16 is a flowchart showing the flow of area connection processing according to the second embodiment.

Described next will be the details of area connection processing used in the area registration processing of this invention. FIG. 16 is a flowchart showing the flow of area discrimination processing, which consists of steps S1601 to S1608. Area connection processing involves connecting a plurality of sub-areas, enlarging the management area on one side, stipulating a parent-child dependency relationship as a variable for sub-area management and reducing the number of variables managed.

Figure 20:
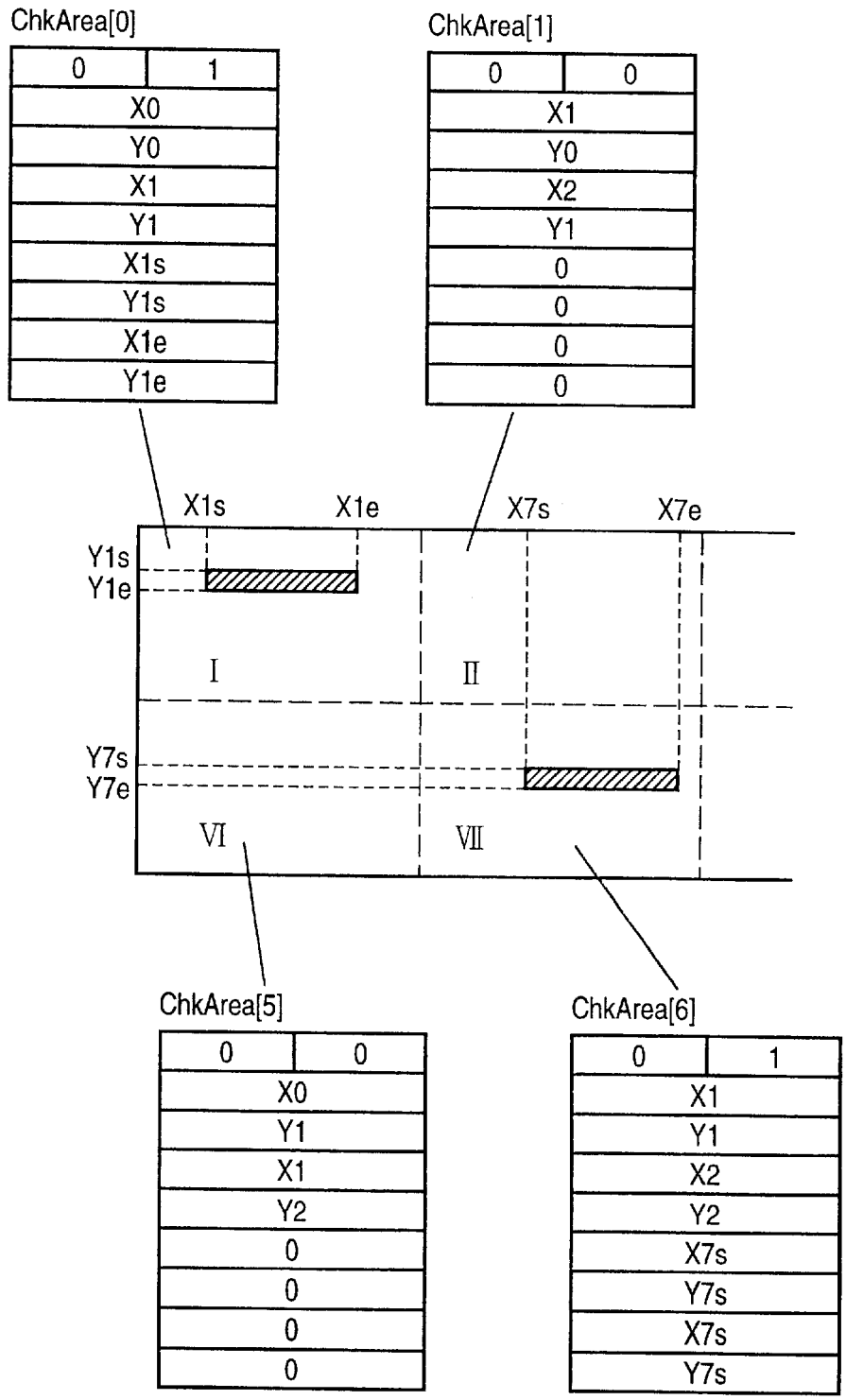
FIG. 20 is a diagram showing the state of an array for management prior to sub-area connection processing according to the second embodiment.
Figure 21:
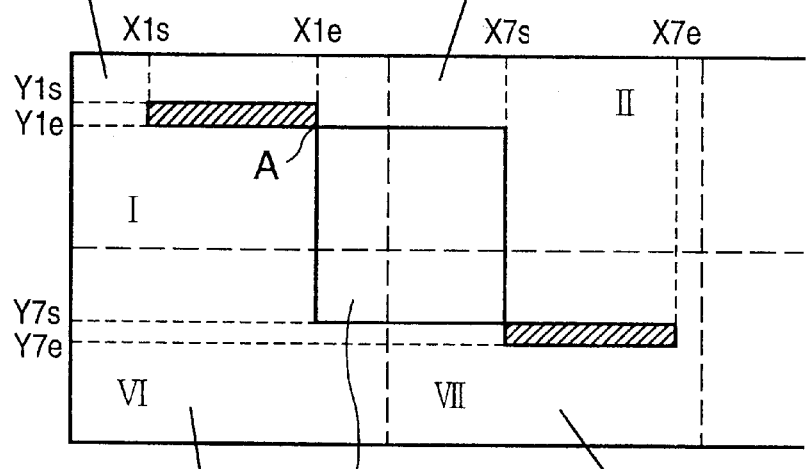
FIG. 21 is a diagram showing the state of an array for management after sub-area connection processing according to the second embodiment.

From the coordinate values of the top-left point of a new rectangular area delivered as an argument, an index number n1 of the sub-area to which this point belongs is obtained. FIGS. 20 and 21 will be referred to in order to describe this in greater detail.

FIGS. 20 and 21 illustrate plot images of sub-areas ①, ②, ⑥, ⑦ within a band area as well as the states of sub-area-management array variables for managing these images. FIG. 20 shows the state prior to sub-area connection processing, and FIG. 21 shows the state after sub-area connection processing, which will now be described. A description will be rendered taking as an example a case where a rectangular region not having a filling pattern is drawn in FIG. 20 as a new plot object of the kind shown in FIG. 21. If the step S1601 in the flowchart of FIG. 16 is applied to FIG. 21, the value of n1 obtained here specifically indicates the sub-area ①, and n1=1 holds.

Control then proceeds to step S1602, at which a comparison involving the area in sub-area n1 is performed. In the case of FIG. 21, a straight line has already been drawn in sub-area 1, and this information has been registered as X1s, Y1s, X1e, Y1e in the area information registration area of ChkArea[0]. If this area information is compared with area information X1e, Y1e of point A at the top left of the new plot object, it is found that the already registered area information is indicative of smaller coordinate values of the top-left point. In this case, therefore, no updating is performed. Thus, at step S1602, a comparison of the areas in the sub-area is performed and updating is carried out using the smaller top-left coordinate values.

This is followed by step S1603, at which this sub-area is defined as being the parent. In FIG. 21, the flag of ChkArea [0] becomes 2 (1702 in FIG. 17), meaning that sub-areas have been connected, and the number of parentArea (1701 in FIG. 17) becomes 0 (the index number of the array of sub-area ①), indicating that this sub-area itself is the parent. Next, at step S1604, the bottom-right coordinates of the rectangular area information of the new plot object are checked, the sub-area to which this point belongs is specified and this index number is made n2. At the moment n2 is obtained, the structure refRect.right (1705 in FIG. 17) and refRect.bottom (1706) of the management variable ChkRect [n1] of the parent area is updated.

In the case of FIG. 21, sub-area ⑦ applies to n2. Accordingly, n2=7 holds and refRect.right (1705 in FIG. 17) and refRect.bottom (1706 in FIG. 17) of ChkRect[0] become X2 and Y2, respectively. Next, an area comparison regarding the bottom-right coordinates is performed at step S1605. The area information is updated by a larger bottom-right value. In this case the information in the variable area of the parent sub-area n1 is updated.

More specifically, in FIG. 21, the values of "right" and "bottom" of the information regRect of ChkArea[0] managing sub-area ① are updated. In other words, X7s is stored in regRect.right (1709 in FIG. 17) of ChkArea[0] and Y7s is stored in regRect.bottom (1710 in FIG. 17).

The value of the management variable Chkarea[n1] of the sub-area that is the parent thus far is updated. From this point onward, updating of the management variables of the dependent child areas is performed.

First, in order to obtain the dependency range, n2–n1 is calculated at step S1606 and processing splits depending upon whether the difference is equal to or greater than 5. If the difference is equal to or greater than 5 ("YES" at step S1606), this indicates that the sub-area in the band spans two levels in the Y direction.

In such case, at step S1607, the flag of ChkRect[ ] from sub-area (n1+1) to (n2–5) and from sub-area (n1+5) to n2 is made 2 (indicating "connection"), and the number of parentArea is updated to 0, which is the index value of the array of management variables of the parent area. As a result, the parent-child dependence relationship is constructed in the sub-area, and a sub-area having this relationship is recognized as being a new sub-area.

Next, the details of area discrimination processing according to the second embodiment of the invention will be described.

Figure 22:
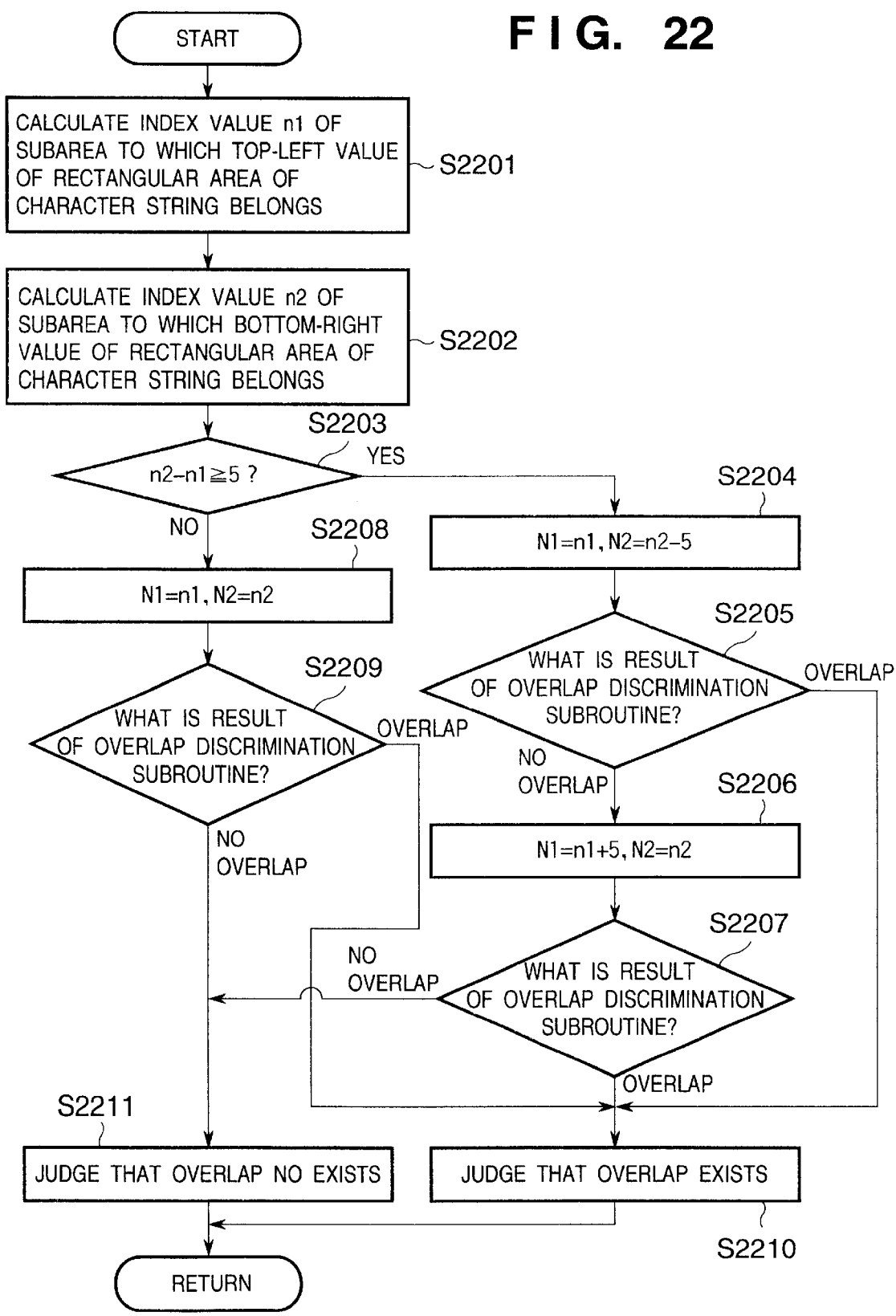
FIG. 22 is a flowchart showing the flow of area discrimination processing according to the second embodiment.

FIG. 22 is a flowchart showing the flow of area discrimination processing, which consists of steps S2201 to S2211. First, it is determined to which sub-area a rectangle circumscribing a character string of interest is related. This entails finding the index value n1 of the sub-area to which the top-left value of the rectangle circumscribing the character string belongs (step S2201) and finding the index value n2 of the sub-area to which the bottom-right value of the rectangle circumscribing the character string belongs (step S2202).

Next, at step S2203, n2–n1 is calculated and processing splits depending upon whether the difference is equal to or greater than 5. If the difference is equal to or greater than 5, this indicates that the sub-area in the band spans two levels in the Y direction. In such case, area information that has been registered in the respective management areas is compared for the first level of X-direction sub-areas n1 to (n2–5) at steps S2204, S2205, and area information that has been registered in the respective management areas is compared for the second level of X-direction sub-areas (n1+5) to n2 (steps S2206, S2207). An overlap discrimination routine used at steps S2205, S2207, S2209 will be described later.

If it is found at step S2203 that the investigated area does not span two levels ("NO" at step S2203), control proceeds to step S2208 and overlap discrimination is performed in regard to sub-areas n1 to n2 (step S2209). The result of overlap discrimination at steps S2205, S2207, S2209, namely a decision that overlap does or does not exist, is adopted as a return value of area discrimination processing, after which processing returns.

Finally, overlap discrimination processing used in the area discrimination processing according to the second embodiment of the invention will now be described in detail.

Figure 23:
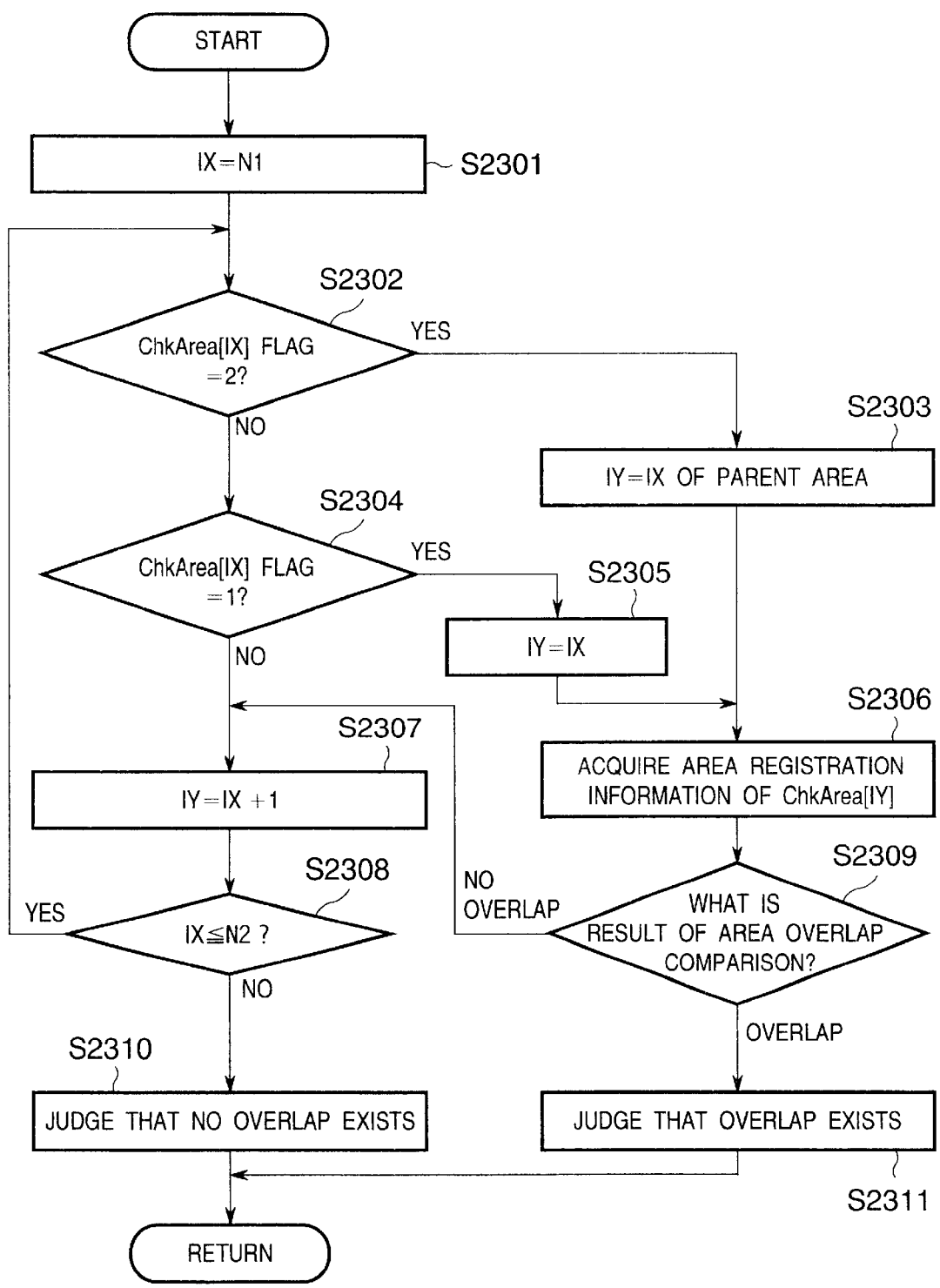
FIG. 23 is a flowchart showing the flow of overlap discrimination processing according to the second embodiment.

FIG. 23 is a flowchart showing the flow of processing of the overlap discrimination subroutine, which consists of steps S2301 to S2311. In FIG. 23, IX, IY represent variables used in the overlap discrimination routine, and N1, N2 indicate arguments set by the side that calls the overlap discrimination routine. First, at step S2301, N1 is substituted into IX. Next, at step S2302, the value of the flag of ChkArea[IX], which is the sub-area management array, is examined. If the value is 2, i.e., if the sub-area is a connected sub-area, control proceeds to step S2303. If the value is not 2, control proceeds to step S2304. The value of the flag is examined in similar fashion. If the value is 1, i.e., if the sub-area is an independent sub-area, control proceeds to step S2305. If the value is not 1, i.e., in a case where drawing has not taken place even once in regard to this sub-area, the value if IX is incremented at step S2307 and the next sub-area is retrieved.

Next, at step S2308, it is determined whether all sub-areas from the sub-area N1 of interest to the sub-area N2 have been examined. If the entire examination has been completed at step S2308, it is judged that there is no overlap with any area (step S2310).

The index number of the parent area is substituted into the variable IY at step S2303, and IX is substituted into the variable IY at step S2305.

Next, step S2306 calls for the acquisition of the value of regRect, which is the area information of ChkArea[IY] that is the management array of the sub-area undergoing investigation, and for comparison with the information of the rectangular area circumscribing the character string. The overlap comparison at step S2309 is the same as the method illustrated as a program in FIG. 10 described earlier. If the result of the comparison is that there is no overlap, control returns to step 2307 and the next sub-area is examined. If the result of the comparison is that there is overlap, this result is returned as a return value.

By virtue of the method described above, a character string that does not have background can be cut from a document in highly precise fashion.

<Third Embodiment>

In the first and second embodiments described above, a hatched pattern or the ruled lines of a spreadsheet that constitute background of text ordinarily surround the text. Therefore, the embodiments hold on the precondition that the text comes later also in a case where information is delivered as the DDI, and an effect obtained is higher print processing speed. In the third embodiment, however, the present invention is shown to be applicable even in a case where this precondition is not satisfied.

Figure 24:
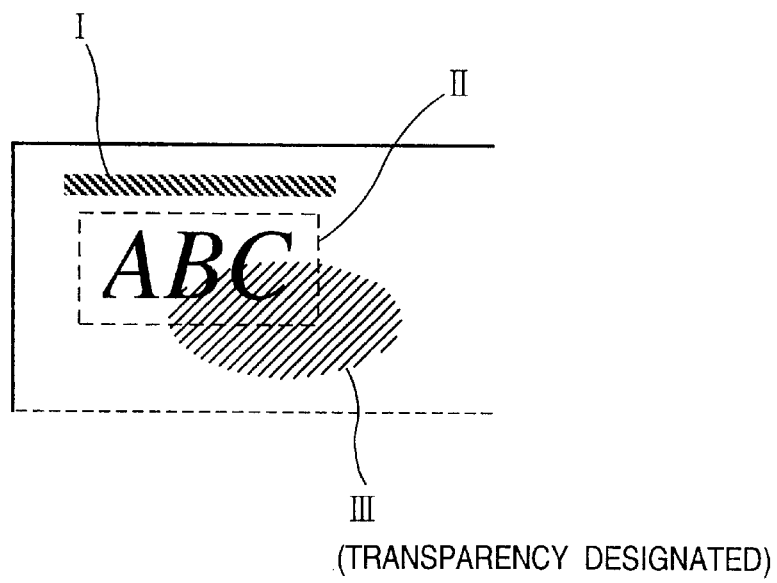
FIG. 24 is a diagram for describing the elimination of inconsistency in the results of printing caused by advancing plotting order.

By way of example, assume, as shown in FIG. 24, that plot information of a rectangle (the bold straight line) was input first as ①, that the character string "ABC" was input next as ②, and that an oval plot with a transparency designation constituting background was input last as ③. Since the area ① and the character string ② do not overlap in terms of their areas, the character string ② is processed as PDL in accordance with the present invention. That is, the plot of the rectangle ① is expanded in the plotter memory on the host side by the plot processing execution unit on the host side. However, the character string ② is subjected to print processing in the plotter memory on the printer side by the plot processing execution unit on the printer side. Accordingly, in a case where the plot object ③ was entered next, the first and second embodiments are such that if the plot object ③ is expanded in the plotter memory on the host side and, at the stage where the plotting of ③ ends, there is no other plot object in this band, the content of the plotter memory in which ① and ③ have been rendered is sent to the printer side as an image and the character string ② is printed by being overwritten on this image. As a result, the transparency designation of the plot object ③ loses its meaning and a correct printed result is not obtained.

In other words, if a plot instruction that makes reference to the plotting area of character string (2) arrives after this area, there is the possibility that the correctness of the printed result will be lost. According to this embodiment, there are two solutions to this problem.

The first solution involves separately managing also the area information of text that has been processed as PDL and judging whether a plot object that is rendered after the text overlaps this area. At the moment overlap with a character string processed as PDL is revealed, the correctness of the image is assured by either of the methods set forth below.

<Method 1>

At the moment overlap with the area of a character string processed as PDL is found, a flag referred to as an "image assurance flag" is set, and the content of the plotter memory processed by the plot processing execution unit on the host side thus far is sent as an image to the printer side using a PDL command. Following the setting of the image assurance flag, the discrimination processing of the present invention is skipped and all subsequent processing is executed in PDL. Though it is possible that this method will not provide optimum performance, the correctness of the image (no inconsistency of printed results due to advance in the plotting order) is assured.

If this method is applied to the printing of FIG. 24, overlap with the area of character string ② that was processed as PDL is revealed at the moment the plot object ③ is processed. First it is construed that expansion has taken place thus far in the plotter memory on the host side, the content of the plotter memory in which the rectangle ① has been rendered is sent as an image to the printer using a PDL image plot command and all processing that follows the processing of ③ is performed as PDL.

<Method 2>

Within the band, print information (typeface, character code, printing position) of a character string processed as PDL is temporarily retained in the memory on the host side. At the moment overlap with the area of a character string processed as PDL is revealed, the print information of the character string being temporarily retained is called from memory and rendering in the plotter memory on the host side in accordance with this information using the plot processing execution unit on the host side.

At this stage the information for area management is updated and so is the character printing area per se. As a result, a correct print image that is in accordance with the order of plotting thus far is formed in the plotter image on the host side. The temporarily retained character-string print information is discharged as this stage and it is possible to continue with ordinary processing of the printer driver. In a case where the print image processed on the host side is sent to the printer side, any rendering or printing that will become background is erased. In order to accomplish this, overwrite plotting is designated and then the image is sent.

If this method is applied to the printing of FIG. 24, overlap with the area of character string ② that was processed as PDL is revealed at the moment the plot object ③ is processed. First the print information of the character string ② temporarily stored thus far in the memory on the host side is called and character print processing is applied to the content of the plotter memory on the host side. Next, area information being managed by the area information of the character string is updated by the area registration means. The plot object ③ is then expanded in the plotter memory on the host side and all plot processing ends. The content of the plotter memory on the host side, therefore, is sent to the printer as image data and the data is printed.

At this time drawing of the image data by overwriting is designated. On the printer side the information of character string ② has already been input as PDL data. After this processing is executed, the text is overwritten by the image expanded on the host side, thereby forming the print image.

By virtue of Methods 1 and 2 described above, the correctness of images can be maintained in the present invention as well.

<Fourth Embodiment>

This embodiment aims to make character print processing more efficient by distinguishing between text and plot objects other than text. It is also desirable to distinguish between graphic-type objects, rather than text, and plot objects other than these graphic-type objects. The processing of graphics is distributed suitably on the host and printer sides. In order to speed up processing, in this embodiment processing is executed based upon a rectangular area that contains the plot object. However, an arrangement may be adopted in which any polygon of rendered polygons is subjected to area judgment in strict fashion.

According to this embodiment, it is assumed that the plot processor within the printer is the plot processing execution unit when PDL-type processing is executed. However, an arrangement may be adopted in which data processing is executed via a network using a module, which is referred to as an RIP (Raster Image Processor), that runs on another personal computer. Adopting such an arrangement makes it possible to implement the present invention in a case where processing capability on the side of the host computer is sufficiently high and in a case where the printer side does not possess a plot processing execution unit.

According to the second embodiment, area management is carried out dividing the area within a band into ten areas of the kind shown in FIG. 13. However, by adaptively changing the number of area partitions in dependence upon the application software, the fineness of discriminated areas will be decided in dependence upon the image. As a result, the strictness of discrimination is raised as necessary and it becomes possible to tune performance to the optimum level. For example, discrimination is made finer for spreadsheet software which involves a large quantity of text and coarser in a draw system in which not that much text is used. Thus, performance may be tuned adaptively.

<Other Embodiments>

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiments.

Figure 25:
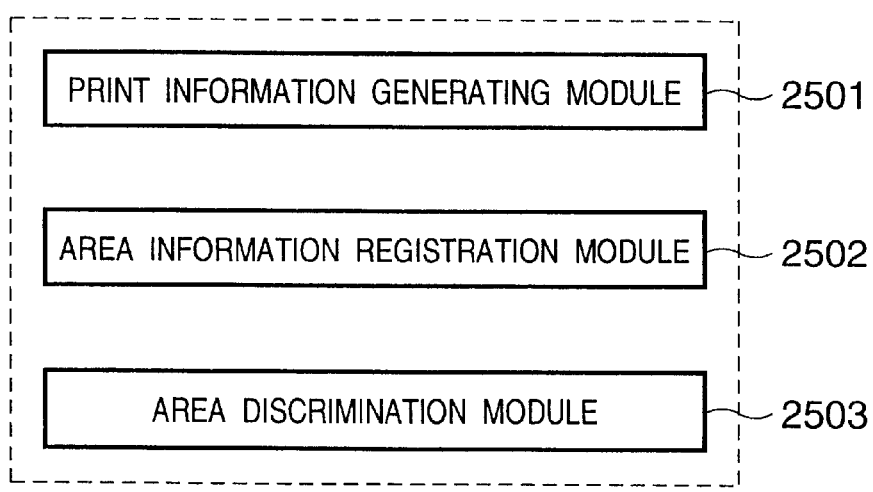
FIG. 25 is a diagram for describing a memory map of a storage medium.

In a case where the present invention is applied to the above-mentioned storage medium, program code corresponding to the flowcharts described above is stored on the storage medium. That is, the modules shown in the example of the memory map of FIG. 25 are stored on the storage medium. Specifically, it will suffice to store program code of at least a "print information generating module 2501", an "area information registration module 2502" and an "area discrimination module 2503" on the storage medium.

Thus, as described above, the information of each DDI is processed sequentially without being spooled, the largest area of a plot object other than text (i.e., other than DrvTextOut) is obtained on each occasion, this area is managed as several sub-areas obtained by partitioning in advance, overlap with this area is checked in DrvTextOut, text in a portion where there is overlap is sent to the printer upon being subjected to image-type plot processing (execution of plot processing is performed in the plotter memory on the host side), and text in a portion where there is no overlap is sent to the printer upon being subjected to PDL-type processing (execution of plot processing is performed in the plotter memory on the printer side), whereby high-speed print processing is executed. Since hatched patterns and ruled lines of a spreadsheet constituting background of text usually contain the text, the first and second embodiments are implemented on the precondition that text will come after also in a case where information is delivered as DDI.

In a case where the precondition does not hold, as indicated in the third embodiment, the correctness of printed results can be assured though there is a possibility of some decline in printing performance.

By adopting an arrangement in which the best components of image-type processing and PDL-type processing are switched between in appropriate fashion, the following effects can be expected:

② In a case where characters not having background are removed from a document, it is possible to eliminate redundant printing of characters that span bands, even in image-type processing.

② In comparison with a driver in which it is possible to separate only characters in an area in which there is no background and images and text are printed by having the user switch between image-type and PDL-type processing, the burden of making the switch is eliminated and suitable performance is achieved.

In particular, it is possible to provide a driver having excellent balance and exhibiting the advantages of both an image-type driver suited to highly complicated drawing high resolution Image processing and a PDL-type driver suited to printing text. This makes it possible to implement print processing at a speed higher than that of the prior art.

The present invention is not limited to the above embodiments and various changes and modifications can be made within the spirit and scope of the present invention. Therefore, to appraise the public of the scope of the present invention, the following claims are made.

What is claimed is:

1. A printing system constituted by a printing apparatus and a data processing apparatus capable of communicating with said printing apparatus via a prescribed communications medium, said system comprising:

print information generating means for generating print information, which is to be printed by said printing apparatus, in response to a print request command;

area information registration means for registering, in a registration area, coordinate information of a plotting area of a print object generated as the print information; and area discrimination means for comparing the coordinate information registered by said area information registration means with character-string print position information when the character string is printed, and discriminating whether these two items of information overlap;

wherein type of processing for printing the character string is switched based upon results of discrimination by said area discrimination means.

2. The system according to claim 1, further comprising:
first character printing means for printing a character pattern, which has been expanded on the side of said printing apparatus, if there is no overlap in the plotting area of the print object based upon results of discrimination performed by said area discrimination means; and
second character printing means for printing a character pattern, which has been expanded on the side of said data processing apparatus, as a bitmap image if there is overlap in the plotting area of the print object based upon results of discrimination performed by said area discrimination means.

3. The system according to claim 1, wherein said area information registration means performs registration using area information relating to a rectangle circumscribing the plot object.

4. The system according to claim 1, wherein said area information registration means registers, in the registration area, minimum values of top-left coordinates and maximum values of bottom-right coordinates of a rectangle circumscribing each plot object that is possibly background of text.

5. The system according to claim 1, wherein said area discrimination means performs discrimination processing sequentially based upon print information generated sequentially in said print information generating means.

6. The system according to claim 1, wherein said print information generating means generates print information that has been rasterized in units obtained by partitioning one page into a plurality of band areas.

7. The system according to claim 1, wherein said print information generating means executes processing upon virtually connecting the plurality of band areas to expand them as one area in a case where a plotting area of a print object relating to a character bridges a plurality of the band areas according to the result of discrimination by said area discrimination means.

8. The system according to claim 1, wherein said area information registration means and said area discrimination means perform registration and discrimination upon partitioning and managing a band area in said print information generating means as a plurality of sub-areas.

9. The system according to claim 1, wherein said area information registration means saves, in the registration area, coordinate-value information which defines the maximum rectangular area that contains all print objects.

10. The system according to claim 1, wherein said registration area has:
a flag portion for identifying an attribute of the plotting area of the print object;
a parent-area portion for identifying a parent area when the plotting areas are connected;
a management area for saving coordinate information of the print object; and
a registration area for saving area information of background of the print object.

11. The system according to claim 1, wherein if said area discrimination means has discriminated overlap between an area of a character string processed as PDL and coordinate information of a subsequently entered print object which is background of the character string, said area discrimination means sets an image assurance flag for identifying the overlap and, after the image assurance flag has been set, subjects all print objects to print processing by said first character printing means, thereby eliminating inconsistency of printed results due to advance in the plotting order of the print objects.

12. The system according to claim 1, further comprising holding means for holding, on the side of said data processing apparatus, print information of a character string processed as PDL in the band area;
wherein if said area discrimination means has discriminated that the area of the character string processed as PDL and coordinate information of a subsequently entered print object which is background of the character string overlap, said area discrimination means calls the print information of the character string being held by said holding means, performs expansion in a plotter memory on the side of said data processing apparatus based upon the print information of the character string, and updates the coordinate information of the plotting area, which has been registered in the registration area, as well as the print information of the character string, thereby eliminating inconsistency of printed results due to advance in the plotting order of the print objects.

13. A print control method, comprising:
a print information generating step of generating print information, which is to be printed by a printing apparatus, in response to a print request command;
an area information registration step of registering, in a registration area, coordinate information of a plotting area of a print object generated as the print information; and
an area discrimination step of comparing the coordinate information registered at said area information registration step with character-string print position information when the character string is printed, and discriminating whether these two items of information overlap;
wherein type of processing for printing the character string is switched based upon results of discrimination.

14. The method according to claim 13, further comprising:
a first character printing step of printing a character pattern, which has been expanded on the side of the printing apparatus, if there is no overlap in the plotting area of the print object based upon results of discrimination performed at said area discrimination step; and
a second character printing step of printing a character pattern, which has been expanded on the side of the data processing apparatus, as a bitmap image if there is overlap in the plotting area of the print object based upon results of discrimination performed at said area discrimination step.

15. The method according to claim 13, wherein said area information registration step performs registration using area information relating to a rectangle circumscribing the plot object.

16. The method according to claim 13, wherein said area information registration step registers, in the registration area, minimum values of top-left coordinates and maximum values of bottom-right coordinates of a rectangle circumscribing each plot object that is possibly background of text.

17. The method according to claim 13, wherein said area discrimination step performs discrimination processing sequentially based upon print information generated sequentially at said print information generating step.

18. The method according to claim 13, wherein said print information generating step generates print information that has been rasterized in units obtained by partitioning one page into a plurality of band areas.

19. The method according to claim 13, wherein said print information generating step executes processing upon virtually connecting the plurality of band areas to expand them as one area in a case where a plotting area of a print object relating to a character bridges a plurality of the band areas according to the result of discrimination at said area discrimination step.

20. The method according to claim 13, wherein said the area information registration step saves, in the registration area, coordinate-value information which defines the maximum rectangular area that contains all print objects.

21. The method according to claim 13, wherein the registration area has:
 a flag portion for identifying an attribute of the plotting area of the print object;
 a parent-area portion for identifying a parent area when the plotting areas are connected;
 a management area for saving coordinate information of the print object; and
 a registration area for saving area information of background of the print object.

22. The method according to claim 13, wherein if said area discrimination step has discriminated overlap between an area of a character string processed as PDL and coordinate information of a subsequently entered print object which is background of the character string, said area discrimination step sets an image assurance flag for identifying the overlap and, after the image assurance flag has been set, subjects all print objects to print processing by said first character printing step, thereby eliminating inconsistency of printed results due to advance in the plotting order of the print objects.

23. The method according to claim 13, further comprising a holding step of holding, in a memory on the side of the data processing apparatus, print information of a character string processed as PDL in the band area;
 wherein if said area discrimination step has discriminated that the area of the character string processed as PDL and coordinate information of a subsequently entered print object which is background of the character string overlap, the area discrimination step calls the print information of the character string being held in the memory, performs expansion in a plotter memory on the side of the data processing apparatus based upon the print information of the character string, and updates the coordinate information of the plotting area, which has been registered in the registration area, as well as the print information of the character string, thereby eliminating inconsistency of printed results due to advance in the plotting order of the print objects.

24. A data processing apparatus for outputting print information to a printing apparatus via a prescribed communications medium, comprising:
 print information generating means for generating print information that is to be printed by said printing apparatus;
 area information registration means for registering, in a registration area, coordinate information of a plotting area of the print information that has been generated;
 area information updating means which, when the coordinate information is registered, is for updating the coordinate information as the maximum area that contains the plotting area; and
 area discrimination means for comparing the coordinate information registered by said area information registration means with character-string print position information when the character string is printed, and discriminating whether these two items of information overlap.

25. A data processing method for processing print information that is output to a printing apparatus, comprising:
 a print information generating step of generating print information that is to be printed by the printing apparatus;
 an area information registration step of registering, in a registration area, coordinate information of a plotting area of the print information that has been generated;
 an area information updating step which, when the coordinate information is registered, is a step of updating the coordinate information as the maximum area that contains the plotting area; and
 an area discrimination step of comparing the coordinate information registered at said area information registration step with character-string print position information when the character string is printed, and discriminating whether these two items of information overlap.

26. A storage medium storing a data processing program for processing print information that is output to a printing apparatus, the data processing program comprising:
 code of a print information generating step of generating print information that is to be printed by the printing apparatus;
 code of an area information registration step of registering, in a registration area, coordinate information of a plotting area of the print information that has been generated;
 code of an area information updating step which, when the coordinate information is updated, is a step of updating the coordinate information as the maximum area that contains the plotting area; and
 code of an area discrimination step of comparing the coordinate information registered at said area information registration step with character-string print position information when the character string is printed, and discriminating whether these two items of information overlap.

27. A storage medium storing a print control program, comprising:
 code of a print information generating step of generating print information, which is to be printed by a printing apparatus, in response to a print request command;
 code of an area information registration step of registering, in a registration area, coordinate information of a plotting area of a print object generated as the print information.

28. The system according to claim 1, wherein said area discrimination means performs discrimination processing based upon print information without spooling.

29. The method according to claim 13, wherein said area discrimination step performs discrimination processing based upon print information without spooling.

30. The storage medium according to claim 27, wherein said code of area discrimination step performs discrimination processing based upon print information without spooling.

* * * * *

UNITED STATES PATENT AND TRADEMARK OFFICE
CERTIFICATE OF CORRECTION

PATENT NO.    : 6,535,293 B1
DATED         : March 18, 2003
INVENTOR(S)   : Mitsuhashi It is certified that error appears in the above-identified patent and that said Letters Patent is hereby corrected as shown below:

Column 10,
Line 38, "being had" should be deleted.

Column 15,
Line 16, "SUB-AREA type" should read -- SUB-AREA-type --.

Column 17,
Line 64, "parent area" should read -- parentArea --.

Column 18,
Line 60, "parent area" should read -- parentArea --.

Column 22,
Line 28, the encircled number "2" should be an encircled number -- 1 --.

Signed and Sealed this

Sixteenth Day of December, 2003

JAMES E. ROGAN
*Director of the United States Patent and Trademark Office*